United States Patent
Prater et al.

(10) Patent No.: US 12,372,401 B2
(45) Date of Patent: Jul. 29, 2025

(54) METHOD AND APPARATUS FOR HIGH PERFORMANCE WIDE FIELD PHOTOTHERMAL IMAGING AND SPECTROSCOPY

(71) Applicant: Photothermal Spectroscopy Corp., Santa Barbara, CA (US)

(72) Inventors: Craig Prater, Santa Barbara, CA (US); Derek Decker, Carmel, CA (US); David Grigg, Santa Barbara, CA (US)

(73) Assignee: Photothermal Spectroscopy Corp., Santa Barbara, CA (US)

( * ) Notice: Subject to any disclaimer, the term of this patent is extended or adjusted under 35 U.S.C. 154(b) by 547 days.

(21) Appl. No.: 17/796,822

(22) PCT Filed: Feb. 1, 2021

(86) PCT No.: PCT/US2021/016070
§ 371 (c)(1),
(2) Date: Aug. 1, 2022

(87) PCT Pub. No.: WO2021/155363
PCT Pub. Date: Aug. 5, 2021

(65) Prior Publication Data
US 2023/0063843 A1    Mar. 2, 2023

Related U.S. Application Data

(60) Provisional application No. 62/968,900, filed on Jan. 31, 2020.

(51) Int. Cl.
*G01J 3/00* (2006.01)
*G01J 3/02* (2006.01)
(Continued)

(52) U.S. Cl.
CPC ............ *G01J 3/108* (2013.01); *G01J 3/0208* (2013.01); *G01J 3/0224* (2013.01);
(Continued)

(58) Field of Classification Search
CPC ........ G01J 3/108; G01J 3/0208; G01J 3/0224; G01J 3/2823; G01J 3/447; G01J 3/453;
(Continued)

(56) References Cited

U.S. PATENT DOCUMENTS

2007/0247630 A1   10/2007   Herring
2008/0043224 A1   2/2008   Castonguay
(Continued)

FOREIGN PATENT DOCUMENTS

WO    WO 2021/155363    8/2021

OTHER PUBLICATIONS

Third Party Observation for EP Application No. 21747199.4, mailed Feb. 2, 2024, 8 pages.
(Continued)

*Primary Examiner* — Michael Maskell
(74) *Attorney, Agent, or Firm* — MERCHANT & GOULD P.C.

(57) ABSTRACT

A system for infrared analysis over a wide field area of a sample is disclosed herein that relies on interference of non-diffractively separated beams of light containing image data corresponding to the sample, as well as a photothermal effect on the sample.

18 Claims, 11 Drawing Sheets

(51) Int. Cl.
*G01J 3/10* (2006.01)
*G01J 3/28* (2006.01)
*G01J 3/447* (2006.01)
*G01J 3/453* (2006.01)

(52) U.S. Cl.
CPC ............ *G01J 3/2823* (2013.01); *G01J 3/447* (2013.01); *G01J 3/453* (2013.01)

(58) Field of Classification Search
CPC .. G01J 3/021; G01J 3/0213; G01J 3/10; G01J 3/42; G01J 3/4531; G01J 3/4535; G01N 2021/1725; G01N 21/171; G01N 21/1717; G01N 21/3563; G02B 21/0056; G02B 21/008; G02B 21/14
USPC ...................................................... 250/504 R
See application file for complete search history.

(56) References Cited

U.S. PATENT DOCUMENTS

| | | | |
|---|---|---|---|
| 2017/0038574 A1 | 2/2017 | Zhuang | |
| 2018/0088041 A1 | 3/2018 | Zhang et al. | |
| 2018/0180642 A1 | 6/2018 | Shetty et al. | |
| 2018/0246032 A1 | 8/2018 | Li et al. | |
| 2020/0025677 A1* | 1/2020 | Prater | .................. H01J 49/004 |

OTHER PUBLICATIONS

Tamamitsu et al., Quantitative Phase Imaging with Molecular Vibrational Sensitivity, Optics Letters, vol. 44, No. 15, Aug. 2019, pp. 3729-3732.
International Search Report and Written Opinion from PCT Application PCT/US2021/016070 dated Apr. 22, 2021, 20 pgs.
Extended European Search Report, Application No. 21747199.4, dated Apr. 26, 2024, 13 pages.
Zhang, "Bond-Selective Transient Phase Microscopy", Arxiv.org, Cornell University Library, 201 Olin Library Cornell University Ithaca, NY 14853, Nov. 27, 2018, XP081429927.
Kemper, B. et al., "Label-Free Quantitative in Vitro Live Cell Imaging with Digital Holographic Microscopy" In: "Label-Free Monitoring of Cells in Vitro", Jan. 1, 2019, Springer Berlin Heidelberg, Berlin, Heidelberg, XP055908880, ISBN: 978-3-030-32432-2, pp. 219-272, retrieve at https://ebookcentral.proquest.com/lib/epo-ebooks/reader.action?docID=5979943&ppg=228.

* cited by examiner

FIG. 2A
FIG. 2B
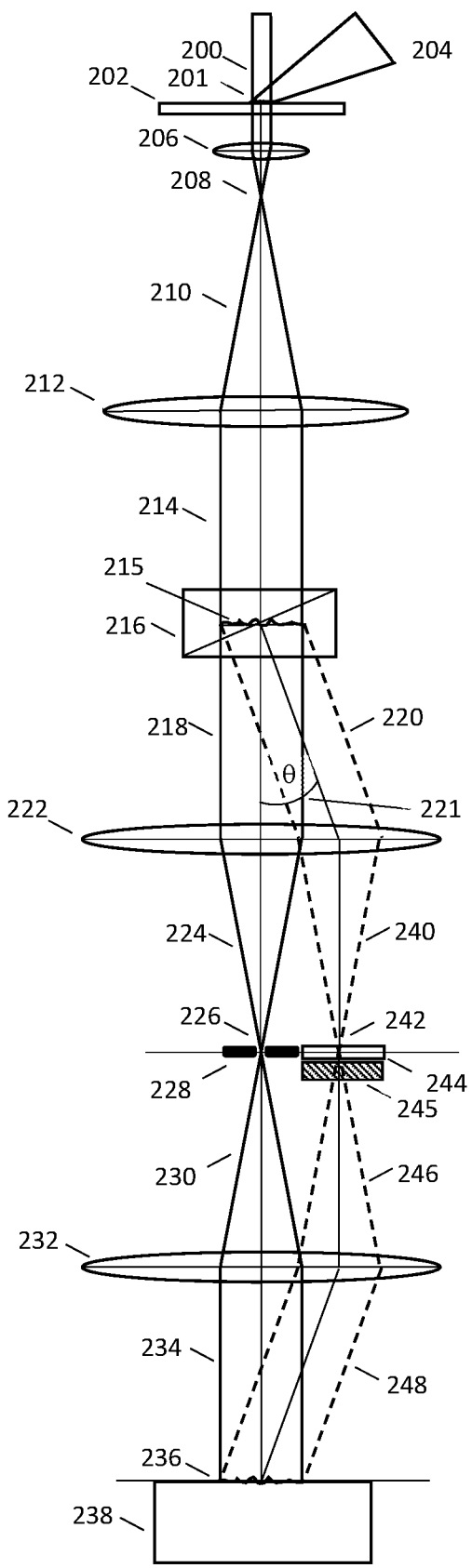
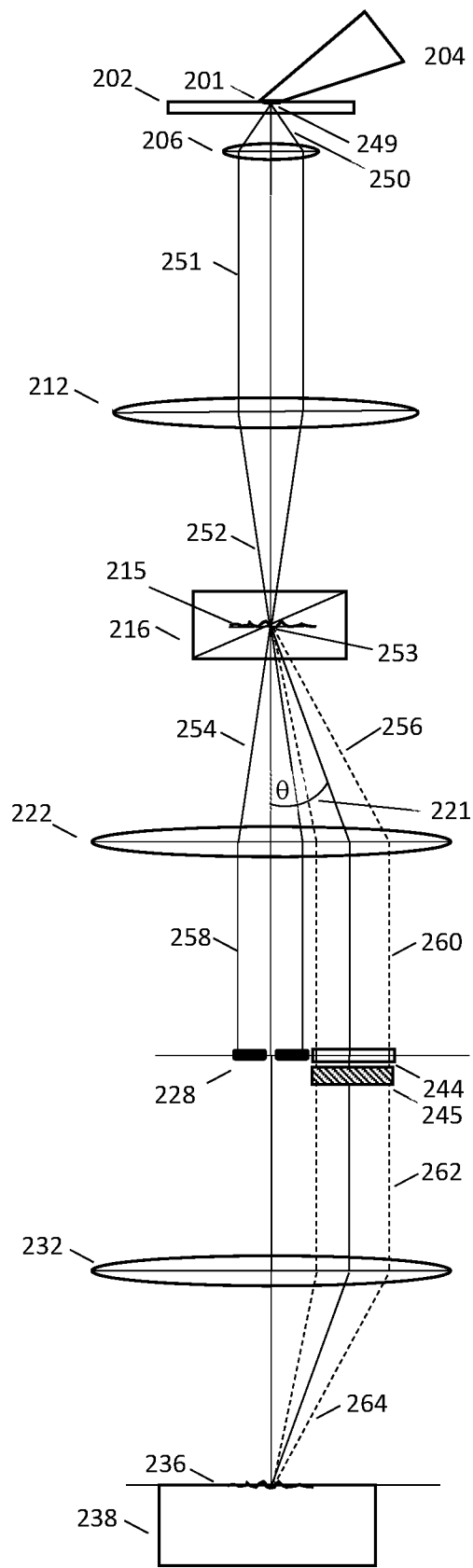

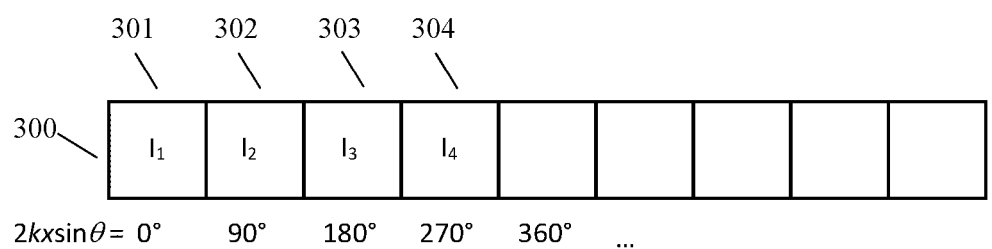
FIG. 3A
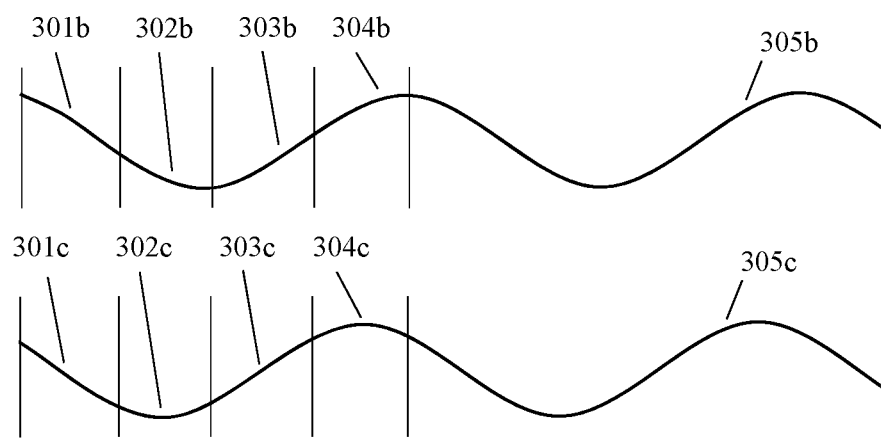
FIG. 3B
FIG. 3C

METHOD AND APPARATUS FOR HIGH PERFORMANCE WIDE FIELD PHOTOTHERMAL IMAGING AND SPECTROSCOPY

CROSS-REFERENCE TO RELATED APPLICATIONS

This application is a National Stage entry of PCT Application No. PCT/US2021/016070 filed Feb. 1, 2021 which claims the benefit of U.S. Provisional Patent Application 62/968,900, filed Jan. 31, 2020, the contents of which are incorporated in full herein by reference.

TECHNICAL FIELD

Embodiments disclosed herein relate to investigating or analyzing materials by the use of optical systems, (i.e., using infrared, visible, or ultraviolet light). Embodiments described herein relate to imaging and spectroscopy, and, more particularly, to enhancements to photothermal imaging and spectroscopy systems and techniques for acquiring spectral information indicative of the optical properties and/or material or chemical composition of a sample, for example, information that correlates to an infrared (IR) absorption spectrum.

BACKGROUND

Fourier Transform Infrared (FTIR) spectroscopy is the most common form of IR spectroscopy. FTIR works by measuring transmission of an infrared light through a sample or reflection of IR light from a sample as a function of wavenumber (a measure of the frequency of the IR light). FTIR based microscopes combine an FTIR spectrometer and microscope optics to provide spatially resolved measurements of IR absorption, transmission, and/or reflection. A bedrock physical constraint on conventional FTIR microscopy is that it can only achieve spatial resolution on the order of the wavelength of the IR light used. The fundamental limit is determined by optical diffraction and is set by the wavelength of the IR light and the numerical aperture of the IR illumination and/or collection optics. Practical limitations may degrade this spatial resolution further. The spatial resolution of the FTIR microscope is wavelength dependent, but is on the order of 10 microns for wavelengths in the mid-IR region (corresponding to wavelengths greater than about 2 microns). An example of an FTIR spectroscopy approach is shown, for example, in U.S. Pat. No. 7,630,081, which describes recent improvements to FTIR interferometers. Conventional FTIR spectroscopy can involve significant sample preparation to ensure appropriate transmission of the mid-IR beam through the sample, which is not practicable or desirable for many opaque, frangible, or biological substances.

Attenuated Total Reflection (ATR) spectroscopy is based on reflection of a beam through an intervening crystal in direct contact with the sample. ATR spectroscopy can achieve somewhat higher spatial resolution than transmission FTIR but requires direct contact of the intervening crystal with the sample which can cause deformation, breaking of the sample, and measurement variability due to the quality of the contact. Both FTIR and ATR suffer from a variety of artifacts that can distort the spectra, including size and shape dependent scattering artifacts and dispersive effects, especially when operated in reflection. These issues can make it very difficult to compare spectra to FTIR library spectra, thus complicating material identification and/or quantification.

Raman spectroscopy is based on illuminating a sample with a narrow band laser source and measuring the spectrum of wavelength shifted light that scatters from the illuminated area. Raman spectroscopy can achieve resolutions as low as a few hundred nanometers in theory, but usually has a practical limit of several hundred nanometers or more. An early example of a Raman spectroscopy approach is shown, for example, in U.S. Pat. No. 2,940,355. Although Raman spectroscopy can achieve resolutions in the hundreds of nanometers range, it also has limitations based on variability of sample fluorescence and much smaller spectral libraries than are available using FTIR.

U.S. Pat. No. 9,091,594 describes an alternative non-destructive approach for photothermal spectroscopy for chemical spectroscopy and imaging that uses two beams of light of differing wavelengths to achieve sub-micron spatial resolution, but in a non-contact manner and without the onerous sample preparation requirements associated with FTIR techniques described above. One method described in that patent includes illuminating a sample with a first beam of IR light having a wavelength of at least 2.5 microns to create a photothermal change in a region within the sample due to absorption of energy from the first beam, and then illuminating at least a portion of the region within the sample with a second beam of light having a wavelength of less than 2.5 microns to detect the photothermal change in the region at a resolution smaller than a diffraction limit of the first beam.

Quantitative Phase Imaging (QPI) is a technique that seeks to extract quantitative measurements of optical phase for optical microscopy applications. Useful review articles on the subject include: (1) Basanta Bhaduri, Chris Edwards, Hoa Pham, Renjie Zhou, Tan H. Nguyen, Lynford L. Goddard, and Gabriel Popescu, "Diffraction phase microscopy: principles and applications in materials and life sciences," Adv. Opt. Photon. 6, 57-119 (2014), https://doi.org/10.1364/AOP.6.000057; and (2) Park, Y., Depeursinge, C. & Popescu, G. Quantitative phase imaging in biomedicine. Nature Photon 12, 578-589 (2018) doi:10.1038/s41566-018-0253-x, both of which are hereby incorporated by reference.

One form of QPI has been combined with infrared spectroscopy as described in Miu Tamamitsu, Keiichiro Toda, Ryoichi Horisaki, and Takuro Ideguchi, "Quantitative phase imaging with molecular vibrational sensitivity," Opt. Lett. 44, 3729-3732 (2019), https://doi.org/10.1364/OL.44.003729, hereby incorporated by reference. While this combination does permit wide field infrared spectroscopy using a QPI based approach, the use of diffractive optics to create interfering sample and reference beams results in a large portion of the light containing sample information to be discarded, thus constraining camera frame rates, reducing signal-to-noise ratio, and/or requiring lengthy data collection times.

Phase contrast microscopy is a well-established technique in optical microscopy (see for example M. Pluta, Advanced light microscopy. Vol. 1, chapter 5, Amsterdam: Elsevier, 1988). Phase contrast microscopy is generally used for creating amplitude (brightness) contrast on highly transparent samples, (e.g., biological cells that produce minimal contrast in brightfield microscopy). Even though biological cells absorb very little light, resulting in minimal brightness contrast, they do incur a significant optical phase change. Phase contrast microscopy is often used to convert the phase shifts induced by biological and other materials into brightness contrast that can then be seen by eye or by a camera. Traditional phase contrast microscopy provides challenges for quantitative analysis of optical phase differences because of various artifacts including complex nonlinear dependence of brightness on sample height, contrast inversions, halo artifacts and other issues. On the other hand, phase contrast microscopy is extremely widely used and available on many thousands of research microscopes around the world. Providing a technique to perform infrared spectroscopy on such a widely distributed platform therefore offers significant benefits. Infrared spectroscopy has also been combined with conventional phase contrast optical microscopy as described in Toda, K., Tamamitsu, M., Nagashima, Y. et al. Molecular contrast on phase-contrast microscope. Sci Rep 9, 9957 (2019) doi:10.1038/s41598-019-46383-6, hereby incorporated by reference. The challenges associated with quantifying measurements in conventional phase contrast microscopy, however, also complicate interpretation of IR absorption signals inferred by conventional phase contrast microscopy. Specifically, nonlinear dependence on sample height (thickness), contrast inversion, halo artifacts and other issues can affect the sensitivity of the measurement of IR absorption and can cause distortions in IR spectra and chemical images obtained by this technique. For example the supplementary information in the article by Toda cited above in this paragraph describes the presence of a "spurious negative signal" that creates distortions in photothermal images when using conventional phase contrast microscopy.

Methods and apparatuses described herein provide improved performance and overcome many of the limitations of prior instruments for infrared spectroscopic analysis.

SUMMARY

Systems and methods are disclosed herein for infrared analysis over a wide field area of a sample. In an embodiment, a system includes an infrared source configured to illuminate a region of the sample with a pump beam of infrared radiation to create in infrared illuminated region; a probe radiation source configured to generate a probe beam that illuminates a wide field region of the sample wherein the wide field region is at least 50 microns in diameter and at least partially overlaps the infrared illuminated region of the sample; a focusing optic arranged to collect the probe beam from the sample; a first optical system comprising a non-diffractive beam splitter that divides the probe beam collected from the sample onto at least two paths, a first path for a reference beam and a second path for a sample beam; a second optical system comprising a 4f optical relay system and arranged to spatially filter the reference beam and create an inteferogram formed between the reference beam and the sample beam as part of an image of the region of the sample on a surface of an array detector that is captured as an image frame of the wide field region of the sample; and an analyzer configured to analyze the image frame to determine signals indicative of photothermal infrared absorption over the wide field area of the sample.

In another embodiment, a system for infrared analysis over a wide field area of a sample includes an infrared source configured to illuminate a region of the sample with a pump beam of infrared radiation to create in infrared illuminated region; a probe radiation source configured to generate a probe beam that illuminates a wide field region of the sample wherein the wide field region is at least 50 microns in diameter and at least partially overlaps the infrared illuminated region of the sample; a focusing optic arranged to collect the probe beam from the sample; a first optical system comprising a non-diffractive beam splitter that divides the probe beam collected from the sample onto at least two paths, a first path for a reference beam and a second path for a sample beam; a second optical system comprising a 4f optical relay system and arranged to spatially filter the reference beam and create an interferogram formed between the reference beam and the sample beam as part of an image of the region of the sample on a surface of an array detector that is captured as an image frame of the wide field region of the sample; and an analyzer configured to analyze the image frame to determine signals indicative of photothermal infrared absorption over the wide field area of the sample, wherein the array detector is a camera and the first optic system and the second optic system are configured to provide an optical throughput efficiency of at least 50%.

In a third embodiment, a system for infrared analysis over a wide field area of a sample includes an infrared source configured to illuminate a region of the sample with a pump beam of infrared radiation to create in infrared illuminated region; a probe radiation source configured to generate an annular probe beam that illuminates a wide field region of the sample wherein the wide field region is at least 50 microns in diameter and at least partially overlaps the infrared illuminated region of the sample; a focusing optic arranged to collect the probe beam from the sample; an optical system comprising a 4f optical relay system including at least one variable phase retarder configured with an annular phase shift pattern to create phase contrast interference between direct/surround illumination probe light that passes through the sample with probe light scattered by the sample to create an interference image on a surface of an array detector that is captured as an image frame of the wide field region of the sample; and an analyzer configured to analyze the image frame to determine signals indicative of photothermal infrared absorption over the wide field area of the sample.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the disclosure.

FIGS. 2A and 2B depict light paths of illumination light and imaging light, respectively, in an embodiment of a high-performance wide field photothermal IR spectroscopy and imaging system.

FIGS. 3A-3C are depictions of phase-separated signal analysis techniques for wide field photothermal IR spectroscopy and imaging, according to an embodiment.

Figure 1:
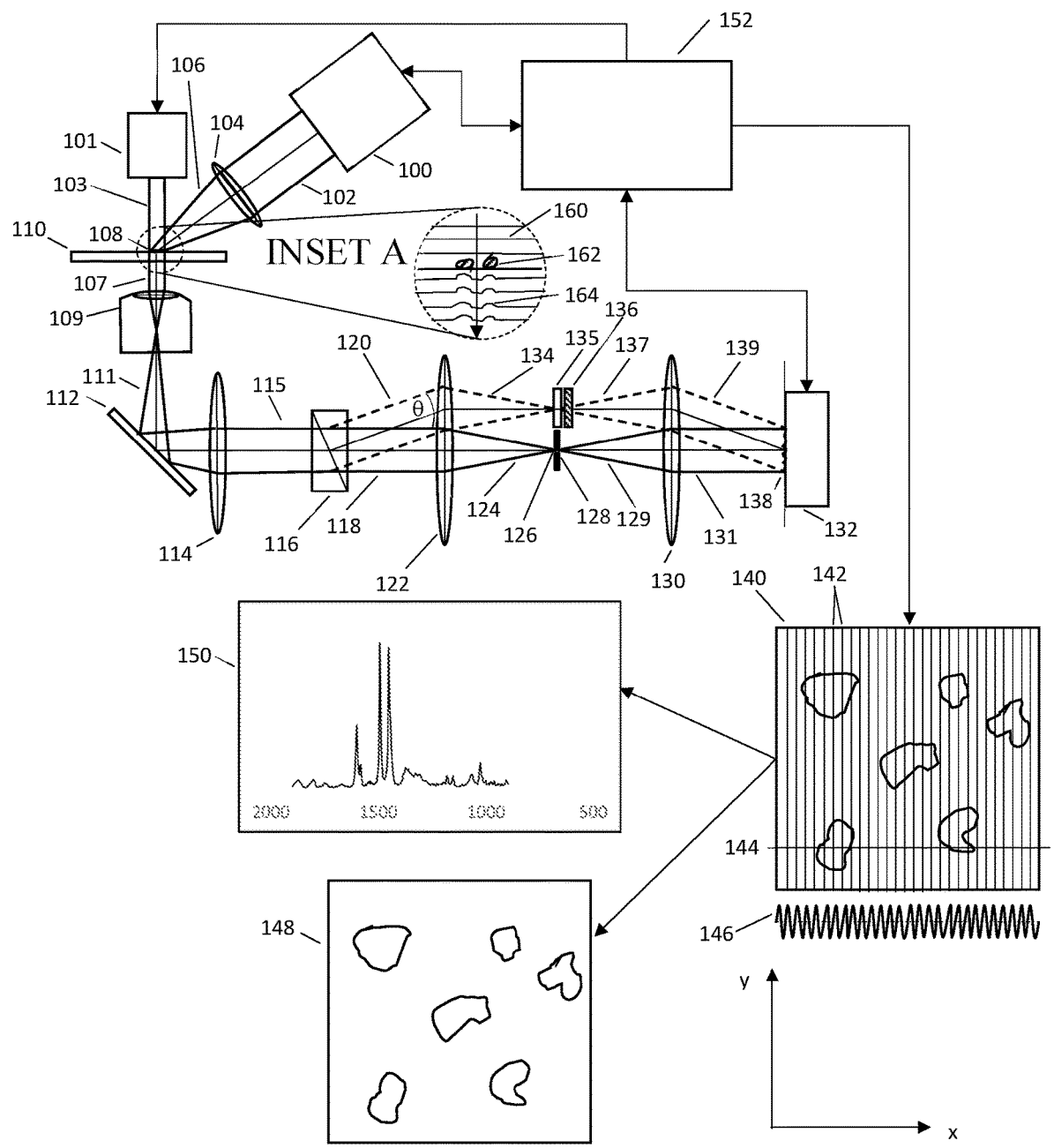
FIG. 1 is a schematic diagram of a system for a high-performance wide field photothermal IR spectroscopy and imaging using a non-diffractive beam splitter, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Definitions

For purposes of this specification, the following terms are specifically defined as follows:

An "analyzer/controller" refers to a system to facilitate data acquisition and control of the photothermal IR spectroscopy system. The analyzer/controller may be a single integrated electronic enclosure or may comprise multiple distributed elements. The control elements may provide control for positioning and/or scanning of the fiber probe and/or sample. They may also collect data about the probe beam intensity, motion, optical phase or other response, provide control over the excitation and/or probe power, polarization, steering, focus and/or other functions. The control elements etc. may include a computer program method or a digital logic method and may be implemented using any combination of a variety of computing devices (computers, Personal Electronic Devices), analog and/or digital discrete circuit components (transistors, resistors, capacitors, inductors, diodes, etc.), programmable logic, microprocessors, microcontrollers, single board computers, application-specific integrated circuits, or other circuit elements. A memory configured to store computer programs may be implemented along with discrete circuit components to carry out one or more of the processes described herein.

"Beam splitter" refers to an optical element that can divide light onto at least two paths. A beam splitter can comprise a plate, a cube and/or a prism or other shapes/configurations that can divide a beam of light. A "non-diffractive beam splitter" is a beam splitter that does not use a diffraction grating or a diffraction pattern to divide the beams. The beam splitter can comprise a thin film that is partially reflecting at the wavelength of interest such that a portion of an incident beam is reflected and another portion is transmitted. A beam splitter may be polarizing, wherein in substantially transmits light of one polarization and reflects light of an orthogonal polarization. A beam splitter may also divide light along two transmission paths based on polarization, for example in the case that the beam splitter is a Rochon, Nomarski or Wollaston prism that divide light onto paths separated by a small angle on the basis of polarization. Another example is a polarizing beam splitter cube which divides light of orthogonal polarization onto two paths separated by 90 degrees. A beam splitter may also be non-polarizing, where light is divided between two paths without substantial dependence on the polarization of the incident light. A beam splitter can also be an optical fiber-based device, for example splitting light from one input optical fiber into at least two output optical fibers, for example a 1×2 fiber coupler. A beam splitter may be a 50:50 beam splitter in which substantially equal fractions of light are directed on two different paths. They can also be unbalanced, for example a 90:10 or 70:30 or similar beam splitter that direction 90% of light on one path and 10% on another, or 70% on one path and 30% on another. Note that a beam splitter can also be used to combine two beams onto the same optical path, i.e. combining one beam that reflects off of the beam splitter interface with another beam that is transmitted through the beam splitter interface. A beam splitter cube, for example, can be used as both a beam splitter and a beam combiner. For example, a Mach-Zehnder interferometer uses one beam splitter to split incident light onto two paths and a second beam splitter to recombine the two beams. In this case, the second beam splitter is being used as a beam combiner. In a Michelson interferometer, a single beam splitter is used to both divide the incident light and then recombine it. Thus, the beam splitter in a Michelson interferometer as being used as both a beam splitter and a beam combiner. A beam splitter/combiner can also be an optical fiber-based device, for example splitter or combining the light from two input fibers into one output fiber, for example a 1×2 fiber coupler. A single 1×2 fiber coupler can be used as both a beam splitter and a beam combiner.

A "camera" refers to an array-based photodetector comprising a plurality of photosensitive pixels. A camera may comprise one or more technology including but not limited to CCD, EM-CCD, CMOS, s-CMOS, and/or other photosensitive array technologies. The camera may support frame rates from a few frames per seconds, hundreds of frames per second, or even thousands of frames per second or higher. "Collecting probe light," "Collecting probe radiation" refer to collecting radiation of a probe light beam that has interacted with a sample. The probe light can be collected after reflection, scattering, transmission, evanescent wave coupling, and/or transmission through an aperture probe.

"Confocal microscopy" refers to a form of optical microscopy in which the light collected at a detector is confined to light that passes through a small volume within the 3D focus volume of an optical objective on a sample. Confocal microscopy is often performed by placing a "confocal aperture" at a focal plane that is equivalent with the focal plane of the sample, thus blocking stray light that does not pass through the focus volume on the sample.

A "detector" refers to a device that produces a signal indicative of the power, intensity and/or energy of light/ radiation incident on the detector surface. The signal will generally be an electrical signal, for example a voltage, current and/or an electrical charge. The detector may be a photodiode, a phototransistor, a charge coupled device (CCD). In some cases, a detector may be a semiconducting detector, for example a silicon PIN photodiode. A detector may also be an avalanche photodiode, a photomultiplier tube, or any other device that produce a change in current, voltage, charge, conductivity or similar upon incidence of light. A detector may comprise a single element, multiple detector elements, for example a bi-cell or quad-cell, a linear or two dimensional array of detector elements, including camera based detectors.

"Diffraction limit" of a light beam means the minimum separation of two optical sources that can be distinguished by a detector. The Abbe diffraction limit d for a microscope having a numerical aperture NA and operating at a wavelength $\lambda$ is defined as $d=\lambda/(2 \cdot NA)$. Physical restraints on the numerical aperture of a microscope prohibit very large numerical apertures, and therefore the diffraction limit of a microscope depends strongly upon the operating wavelength used for detection, with large wavelengths corresponding to relatively poor resolution and high wavelengths corresponding to increased precision.

"Direct light" and "surround light" both refer to light that is substantially undeflected after interacting with a sample.

"Demodulate" or "demodulation" refers to extracting an information-bearing signal from an overall signal, usually, but not necessarily at a specific frequency. For example, in this application, the collected probe light collected at a photo detector represents an overall signal. The demodulation process picks out the portion that is being perturbed by infrared light absorbed by the sample. Demodulation can be accomplished by a lock-in amplifier, a fast Fourier transform (FFT), a calculation of a discrete Fourier component at a desired frequency, a resonant amplifier, a narrow band bandpass filter, or any other technique that largely enhances the signal of interest while suppressing background and noise signals that are not in sync with the modulation.

A "demodulator" refers to a device or system that performs demodulation.

"Figure of merit" refers to any metric or indicator of the relative quality of a signal or measurement. The figure of merit can for example be a measurement sensitivity, a signal strength, a noise level, a signal to noise ratio, a background level, a signal to background ratio, any combination of these, or other metric that lets one rank the relative quality of a signal and/or measurement. Additionally, figures of merit relevant to the embodiments described herein include image acquisition rate, transverse resolution, temporal phase sensitivity, and spatial phase sensitivity.

"Focusing optic" refers to one or more optical elements with the ability to focus light. A focusing optic can comprise one or more refractive lenses, curved mirrors, diffractive optics, Fresnel lenses, volume hologram, metamaterial, or any combination thereof or any other device or component capable of focusing radiation. "Collimating optic" refers to any of the above optical elements arranged in a way to generally collimate radiation. In some cases the same optic (s) may serve as both a focusing optic and a collimating optic, for example focusing light in one direction of propagation and then recollimating the light in the opposite direction of propagation. In drawings herein are often illustrated for simplicity as a single simple lens. In practice they may often be groups of lenses. For example a microscope objective normally comprising many lenses in a complex arrangement will just be indicated by a single lens icon. Similarly, the use of a lens icon in a drawing does not imply that only a lens can be used to achieve the design goal. It is understood that any of alternate focusing optics defined above (e.g., curved mirrors, etc.) or any combination thereof can be used in place of the simple lens shown in the drawings.

A "4f optical relay system" in the context of this application is an optical system comprising at least two focusing optics and comprising an intermediate Fourier transform plane between two of the focusing optics. The simplest 4f relay system in this context can comprise two lenses spaced their focal lengths from the intermediate Fourier transform plane. The two lenses may have the same focal lengths in which case the system has unitary magnification, or the lenses may have different focal lengths to enable additional magnification or demagnification in the relay system. The focusing elements need not be lenses and can instead be curved mirrors or any of the other optics as defined in the term "focusing optic."

"Fluorescence" refers to the emission of light from a sample at one wavelength due to excitation at another wavelength due to fluorescent excitation and emission processes.

"Illuminate," "Illuminating," and "Illumination" mean to direct radiation at an object, for example a surface of a sample, the probe tip, and/or the region of probe-sample interaction. Illumination may include radiation in the infrared wavelength range, visible, and other wavelengths from ultraviolet to a millimeter or more. Illumination may include any arbitrary configuration of radiation sources, reflecting optics, focusing optics, and any other beam steering or conditioning elements.

"Infrared absorption spectrum" refers to a spectrum that is proportional to the wavelength dependence of the infrared absorption coefficient, absorbance, or similar indication of IR absorption properties of a sample. An example of an infrared absorption spectrum is the absorption measurement produced by a Fourier Transform Infrared spectrometer (FTIR) (i.e., an FTIR absorption spectrum). In general, infrared light will either be absorbed (i.e., a part of the infrared absorption spectrum), transmitted (i.e., a part of the infrared transmission spectrum), or reflected. Reflected or transmitted spectra of a collected probe light can have a different intensity at each wavelength as compared to the intensity at that wavelength in the probe light source. IR measurements are often plotted showing the amount of transmitted light as an alternative to showing the amount of light absorbed. For the purposes of this definition, IR transmission spectra and IR absorption spectra are considered equivalent as the two data sets as there is a simple relationship between the two measurements.

"Infrared source" and "source of infrared radiation" refer to one or more optical sources that generates or emits radiation in the infrared wavelength range, generally at least a subset of the range between 2-25 microns. The radiation source may be one of a large number of sources, including thermal or globar sources, supercontinuum laser sources, frequency combs, difference frequency generators, sum frequency generators, harmonic generators, optical parametric oscillators (OPOs), optical parametric generators (OPGs), quantum cascade lasers (QCLs), interband cavity lasers (ICLs), synchrotron infrared radiation sources, nanosecond, picosecond, femtosecond and attosecond laser systems, $CO_2$ lasers, microscopic heaters, electrically or chemically generated sparks, and/or any other source that produces emission of infrared radiation. The source emits infrared radiation in a preferred embodiment, but it can also emit in other wavelength ranges, for example from ultraviolet to THz. The source may be narrowband, for example with a spectral width of <10 cm$^{-1}$ or <1 cm$^{-1}$ less, or may be broadband, for example with a spectral width of >10 cm$^{-1}$, >100 cm$^{-1}$ or greater than 500 cm$^{-1}$. Broadband sources can be made narrow band with filters, diffraction gratings, monochromators and other devices. The infrared source can also be made up of one of discrete emission lines (e.g., tuned to specific absorption bands of target species).

"Interacting" in the context of interacting with a sample means that light illuminating a sample is at least one of scattered, refracted, absorbed, retarded, aberrated, diverted, diffracted, transmitted, and reflected by, through and/or from the sample.

A "lock-in amplifier" is one example of a "demodulator" (defined above) and is a device, system, and/or an algorithm that demodulates the response of a system at one of more reference frequencies. Lock-in amplifiers may be electronic assemblies that comprise analog electronics, digital electronics, and combinations of the two. They may also be computational algorithms implemented on digital electronic devices like microprocessors, field programmable gate arrays (FPGAs), digital signal processors, single board computers, and personal computers. A lock-in amplifier can produce signals indicative of various metrics of an oscillatory system, including amplitude, phase, in phase (X) and quadrature (Y) components or any combination of the above. The lock-in amplifier in this context can also produce such measurements at both the reference frequencies, higher harmonics of the reference frequencies, and/or sideband frequencies of the reference frequencies.

"Modulating" or "modulation" when referring to radiation incident on a sample refers to changing the infrared laser intensity at a location periodically. Modulating the light beam intensity can be achieved by means of mechanical chopping of the beam, controlled laser pulsing, and/or deflecting the laser beam, for example by a tilting mirror that is driven electrostatically, electromagnetically, with piezo actuators or other means to tilt or deform the mirror, or high speed rotating mirror devices. Modulation can also be accomplished with devices that provide time varying transmission like acousto-optic modulators, electro-optic modulators, photo-elastic modulators, Pockels cells, and the like. Modulation can also be accomplished with diffraction effects, for example by diffractive MEMS-based modulators, or by high-speed shutters, attenuators, or other mechanisms that change the intensity, angle, and/or phase of the laser intensity incident on the sample.

"Near infrared light" generally refers to a wavelength range of infrared (IR) light corresponding to 0.75-2 µm.

"Optical property" refers to an optical property of a sample, including but not limited to index of refraction, absorption coefficient, reflectivity, absorptivity, real and/or imaginary components of the index refraction, real and/or imaginary components of the sample dielectric function and/or any property that is mathematically derivable from one or more of these optical properties.

"Optical response" refers to the result of interaction of radiation with a sample. The optical response is related to one or more optical properties defined above. The optical response can be an absorption of radiation, a temperature increase, a thermal expansion, a photo-induced force, the reflection and/or scattering of light, change in brightness, intensity, optical phase, or other response of a material due to the interaction with illuminating radiation.

A "narrowband light source" a light source with a narrow bandwidth or linewidth, for example a light of linewidth smaller than 8 cm-1, but in general it can be a light source with a linewidth narrow enough that the linewidth does not cover a spectral range of interest of the sample.

"OPTIR" refers to Optical Photothermal Infrared Spectroscopy, a technique in which a probe beam is used to measure the photothermal distortion on a sample due to the absorption of infrared light. The shorter wavelength of the probe beam provides spatial resolution much higher than can be achieved by conventional IR spectroscopy. The OPTIR technique generally produces at least one of infrared absorption spectra and/or infrared absorption images.

"Photothermal distortion" refers to a change in the properties of a sample due to absorption of optical energy, for example the absorption of IR radiation. The photothermal distortion may refer to a change in index of refraction, reflectivity, thermal expansion, surface distortion, or other effects that can be detected with a probe beam. A photothermal distortion can impart a change in intensity, size, radiation distribution, direction, and/or optical phase of a probe beam interacting with an IR absorbing region of a sample.

A "probe source," "probe light source," or "probe radiation source" refer to a radiation source that can be used for sensing of an optical property of a sample. A probe light source can be used to sense the response of the sample to the incidence of light from the infrared light source. The radiation source may comprise a gas laser, a laser diode, a diode pumped solid state laser (DPSS), a superluminescent diode (SLD), a near infrared laser, a UV and/or visible laser beam generated via sum frequency or difference frequency generation, for example. It may also comprise any or other sources of near-infrared, UV, and/or visible light that can be focused to a spot and/or imaged with a resolution on the scale smaller than 2.5 micrometer, and or even smaller than 1 micrometer, and possibly smaller than 0.5 micrometer. In some embodiments, the probe light source may operate at a wavelength that is outside the tuning or emission range of the infrared light source, but the probe light source can also be a fixed wavelength source at a select wavelength that does in fact overlap with the tuning range of the infrared light source. A "probe light beam" or "sensing light beam" is a beam originally emitted from a probe light source.

"Probe beam" is a beam of light or radiation that is directed onto a sample to detect a photothermal distortion or other optical change resulting from the interaction of IR radiation with the sample, for example to detect the absorption of IR radiation by the sample. The probe beam may be a tightly focused spot or may instead illuminate a wide area of a sample.

"Raman" refers to light that is inelastically scattered from a sample at one or more wavelengths that are different from the excitation wavelength due to Raman scattering. "Raman spectroscopy" refers to measuring the spectroscopic content (Raman spectra) of Raman scattered light, for example the intensity of Raman scattered light as a function of Raman shift. "Raman spectrometer" is a device for examining Raman shifts in light collected from a sample and producing Raman spectra and/or Raman images.

"Scattered light" refers to light in which the propagation angle(s) of the light is altered due to interaction with a sample, such as by diffraction. In the context of phase contrast microscopy, this may also be referred to as "diffracted light."

"Signal indicative of" refers to a signal that is mathematically related to a property of interest. The signal may be an analog signal, a digital signal, and/or one or more numbers stored in a computer or other digital electronics. The signal may be a voltage, a current, or any other signal that may be readily transduced and recorded. The signal may be mathematically identical to the property being measured, for example explicitly an absolute phase signal or an absorption coefficient. It may also be a signal that is mathematically related to one or more properties of interest, for example including linear or other scaling, offsets, inversion, or even complex mathematical manipulations.

A "retarder" refers to an optical element that induces a relative optical phase delay in an optical path. Examples of retarders are wave plates, for example half wave plates, quarter wave plates and eight wave plates. One or more retarders/wave plates can be used to introduce an optical phase difference between two polarizations of light, for example to introduce a phase difference between two paths of a quadrature interferometer. A "variable retarder" is a retarder that can introduce an optical phase delay that is controllable via an external signal, for example a liquid crystal variable retarder.

A "spatial light modulator" is a device that provides position addressable control over the amplitude and/or optical phase of a light beam that is reflected off of it or transmitted through it. A spatial light modulator can comprise a 2D array of electronically addressable variable retarders, including liquid crystal variable retarders. Spatial light modulators can also include reflective devices such as liquid crystal on silicon (LCOS), and MEMS based devices like micro-mirror array devices.

"Spectrum" refers to a measurement of one or more properties of a sample as a function of wavelength or equivalently (and more commonly) as a function of wavenumber.

"Wide field" refers to using a camera or array detector to measure a plurality of sample locations substantially simultaneous, and not a single point detector that measures a single point on a sample at a time. In other words, a wide field detection system looks at captures entire frames or images corresponding to an extended region of a sample, rather than just data from a single point on a sample. A wide field region may correspond to a region on a sample least 50 µm across, or at least 100 µm, or at least 500 µm across.

The terms "about" or "approximate" and the like are synonymous and are used to indicate that the value modified by the term has an understood range associated with it, where the range can be ±20%, ±15%, ±10%, ±5%, or ±1%.

The term "substantially" is used to indicate that a result (e.g., measurement value) is close to a targeted value, where close can mean, for example, the result is within 80% of the value, within 90% of the value, within 95% of the value, or within 99% of the value.

Embodiments described herein improve upon earlier photothermal characterization systems in that they provide more rapid sample characterization, eliminate artifacts endemic to QPI systems, and do not require burdensome sample preparation methods of conventional systems. Signal to noise can be enhanced along with optical efficiency when compared to OPTIR and QPI systems that were previously state of the art, while expensive equipment such as high-speed cameras.

High-Performance Wide Field Photothermal IR Optical Phase Spectroscopy

FIG. 1 is a simplified schematic diagram of an embodiment of an Optical Photothermal Infrared (OPTIR) spectroscopy and imaging system for wide field chemical analysis using interferometric optical phase measurements. An infrared source 100 emits a beam of infrared radiation 102 onto a region 108 of sample 110. IR beam 102 may be a beam directly out of IR source 100, or may be optionally focused (or even expanded) by focusing optic 104. In any case, the IR beam is arranged to illuminated a wide region of the sample, for example at least 25 µm across, but preferably at least 50 µm across, or even >100 µm or >500 µm across, depending on the power level of the IR source and the desired size of the measurement region. When the wavelength of the infrared radiation 102 is set to a wavelength corresponding to one or more IR absorption bands of sample region 108, the absorbing regions heat up, causing photothermal distortions in the IR absorbing regions of the sample. These photothermal distortions can comprise changes in thermal expansion, deflection, deformation, size, shape, curvature, reflectivity, and/or index of refraction of the heated IR absorbing regions. These photothermal distortions can result in a change in the amplitude and/or optical phase of probe beam radiation that interacts with the sample that are measured to produce signals indicative of the IR absorption properties of the IR illuminated region of the sample. FIG. 1 illustrates one embodiment of extracting wide field measurements of dynamic changes in optical phase resulting in localized sample heating from IR absorption. These measurements in optical phase change can be analyzed produce chemical images 148 and/or IR absorption spectra 150.

To measure signals indicative of infrared absorption, probe beam 103 from probe beam source 101 is transmitted through sample 110 at least partially overlapping IR illuminated region 108. Probe beam 103 is also arranged to illuminate a wide field region of the sample. Probe beam 103 can come directly from probe beam source, for example as a collimated laser beam. It can also be focused or expanded as desired using focusing optics not shown. In one embodiment, probe beam 103 can first be focused onto the back focal plane of a condenser or objective to form a collimated illumination beam at the sample 110, for example as used in Kohler illumination schemes. When the probe beam 103 passes through the IR illuminated region of sample 110, a pattern of the sample's optical properties is imprinted on the transmitted probe radiation 107 as illustrated schematically in INSET A. INSET A shows incident plane waves 160 encountering materials 162 of different index of refraction than their surroundings resulting in distortions 164 in the transmitted wavefront. INSET A schematically illustrates retardations in the optical phase of the transmitted plane waves passing through regions of higher optical density (e.g., higher index of refraction). INSET A is a conceptual illustration and is not to scale or intended to correspond to actual data. INSET A illustrates a simple static case, but similar physics applies in the case of a dynamic change in the optical phase due to a photothermal distortion from IR absorption. The current embodiment enables rapid wide field measurement of subtle changes in optical phase due to IR absorption of by regions of the sample, thus providing spatially resolved chemical analysis of the sample. Optical phase-based measurement can be specifically advantageous because many samples, for example biological materials, are highly transparent to visible radiation. For this reason, they provide only very minor changes in intensity (amplitude) when light is transmitted through them. But even though biological materials can be highly transparent to visible light, they can still accumulate a large change in optical phase. For example, a typical biological cell can induce around 90° of optical phase change in transmission. For example, consider a biological cell that is 5 µm thick and with a typical index of refraction of 1.36 vs an index of 1.335 for the surrounding aqueous media. This thickness and index change cause a retardation of 5 µm×(1.36-1.335)=0.125 µm, or around 0.23λ, or about a quarter wavelength (~90°). For biological samples measuring changes photothermal changes in this relatively large optical phase can in some cases be more sensitive than measuring photothermal changes in relatively small changes in optical intensity of highly transparent samples.

To make a measurement of the sample imprint on the incident probe radiation 103, transmitted probe radiation 107 passing through sample 110 is collected by focusing optic 109, typically a high numerical microscope objective, but can also be any other focusing optic. The collected probe radiation 111 is optionally reflected off mirror 112 (or directed/steered by other optional optics not shown) to first focusing optic 114, typically a tube lens of an optical microscope. Alternately first focusing optic 114 may be a separate optic for example mounted external to the body of an optical microscope. First focusing optic 114 generally collimates the illuminating beam of probe radiation transmitted through the sample. (Note that the light paths illustrated in FIG. 1 represent the paths of the illumination probe beam. FIG. 2A-B separately illustrates the paths of the illumination and imaging beams.) The generally collimated probe beam 115 then passes to a non-diffractive beam splitter 116 that separates the transmitted, collimated probe beam 115 into two separate beams 118 and 120, each of the beams 118 and 120 corresponding to a different polarization of light. In the embodiment illustrated in FIG. 1, the beam splitter 116 is illustrated as a Rochon prism (i.e., a prism that leaves one beam 118 undeflected and diverts a second beam 120 by an angle θ). Alternate beam splitters may be used, for example a Wollaston prism that divides the two beams symmetrically at ±θ.

Both beams 118 and 120 are then incident on a second focusing optic 122, for example the first optic in a 4f relay system. Focusing optic 122 focuses both the undeflected transmitted beam 124 and the deflected beam 134. The focus 126 of beam 124 is arranged to pass through a spatial filter 128. Spatial filter may for example be a small aperture pinhole, a clear region in a metal mask on glass, a pattern on a spatial light modulator or other device with a small transmissible aperture. As will be explained in more detail associated with FIG. 2, the aperture of spatial filter 128 is chosen to essentially erase all imprint of the sample from transmitted probe beam that passes through the spatial filter. This is done such that filtered beam 129 can act as an essentially feature-free reference beam against which angle deflected beam 134 will be interfered. Returning to beam splitter 116, in the embodiment shown this beam splitter divides the two beams by polarization, such that one polarization is undeflected (beam 118) and the beam 120 of orthogonal polarization is deflected by the angle θ. The means that beam 134 is nominally orthogonally polarized as compared to beam 124. The current embodiment will re-interfere the undeflected reference beam and deflected sample beam, so a polarization rotator 135 is placed in the path of beam 134. Polarization rotator 135 for example can be a half wave plate which will rotate the polarization of beam 134 by 90°. Alternately polarization rotator 135 can be formed by a transmissive spatial light modulator that can adjust the phase delay of beam 134. (Spatial filter 128 can also be formed using a spatial light modulator and/or a single spatial light modulator can perform both the spatial filtering and polarization rotating tasks.) Optional neutral density filter 136 can also be used to attenuate the probe beam 137 on the sample path if desired such that it is similar or equal in intensity to the reference beam 129. Neutral density filter 136 may be a fixed attenuation or a variable attenuation, for example a variable neutral density filter wheel. Beam 137 that transmits through the polarization rotator is then arranged to have essentially the same DC optical phase as spatially filtered reference beam 129. Both beams then pass through third focusing optic 130 to be recombined at the surface 138 of detector 132, typically a camera 132 or other array-based detector. The two beam 131 and 139 that transmit through focusing optic 130 combine at surface 138 of camera 132 to form an interferogram 140, comprising a larger number of interference fringes 142 (two fringed indicated). A cross section 144 through this interferogram 140 reveals an oscillatory pattern 146 with slight shifts in the positions of the peaks resulting from any phase lags resulting from optical retardation of objects on the sample in the path of the illuminating probe beam. (The drawing of interferograms 140/146 are simplified conceptual illustrations and not to scale.) Image interferograms 140 are analyzed by controller/analyzer 152 that compares interferograms obtained with the IR light on ("hot frame") to interferograms with the IR light off ("cold frame," or at least at a lower IR power level). Controller/analyzer 152 analyzes the differences in the interferograms between the hot and cold frames to produce signals indicative of IR absorption, for example IR spectrum 150 and/or IR absorption image 148. IR spectrum 150 is produced by plotting the signal indicative of IR absorption analyzed from the hot/cold interferograms as a function of the wavelength (or equivalently wavenumber) of the IR source 100. IR absorption image 148 is created by plotting the signal indicative of IR absorption for one or more wavelengths of IR light over a plurality of locations of the sample, e.g. at a plurality of pixel positions on array sensor 132 and/or at a plurality of relative locations of IR/probe beam relative on sample 110, e.g. by translating the sample 110 under the probe and IR beams 102 and 103. As described later, the analyzing of hot and cold frames can also be performed by an onboard controller/analyzer built into the array sensor 132, e.g. on a field programmable gate array built into a camera sensor assembly.

The interference pattern 140 arises between beams that strike the camera 138 arriving on two separate paths: (a) the deflected path that carries the optical imprint of the sample; (b) the undeflected path where the sample imprint has been erased by the spatial filter. The interferogram pattern 140 that appears on camera 132 has the series of linear interference fringes 142 because sample and reference beams 139 and 131 interfere with each other at the angle θ. The interferogram pattern 140 may have the general form of:

$$I(x,y) = I_r(x,y) + I_s(x,y) + \sqrt{I_r(x,y)I_s(x,y)} \cos(2k \times \sin\theta + \phi(x,y)) \quad \text{Eq. 1:}$$

Where $I(x,y)$ is the intensity measured at x,y locations of the camera sensor, $I_r$ is the reference field intensity, $I_s$ is the sample field intensity, k is the wavevector i.e. $k=2\pi/\lambda$, and $\phi(x,y)$ is the local optical phase difference between the sample and reference path, including any phase differences introduced by the transmission of light through the sample.

The period $\Delta x$ of the interference fringes can be estimated by the equation:

$$\Delta x = \frac{\lambda}{2\sin\theta} \quad \text{Eq. 2}$$

The interferogram images can be analyzed as described in a following section entitled "Phase reconstruction and differential phase calculation" to create a signal indicative of IR absorption by the sample over a wide area.

Table 1 below estimates the performance that can be achieved with the embodiment of FIG. 1 as compared to the performance estimated from the apparatus of Tamamitsu et al, as best discerned from the publication Miu Tamamitsu, Keiichiro Toda, Ryoichi Horisaki, and Takuro Ideguchi, "Quantitative phase imaging with molecular vibrational sensitivity," Opt. Lett. 44, 3729-3732 (2019), https://doi.org/10.1364/OL.44.003729. The table inputs for the Tamamitsu publication either come from the publication directly or from manufacturer's specifications for components identified. The bottom line performance factor indicated in the number of photons that arrive at each camera pixel per second. As can be seen by TABLE 1, the embodiment of FIG. 1 can achieve more than three orders of magnitude more photons per second. For a well optimized optical system the SNR scales like the square root of the photon flux. Thus, the current embodiment provides and improvement of $$\sqrt{\frac{4.26E+08}{1.76E+05}} = 49X$$

in SNR over the estimated performance of the Tamamitsu publication.

TABLE 1

|  | Current Embodiment | | Tamamitsu (estimate) | |
|---|---|---|---|---|
| Wavelength | 532 | nm | 517 | nm |
| energy per photon | 3.74E−19 | J | 3.84E−19 | J |
| input laser power | 200 | mW | 1500 | mW |
| rep rate | 50000 | Hz | 1000 | Hz |
| rep period | 20 | psec | 1 | msec |
| visible pulse time | 1 | psec | 130 | nsec |
| duty cycle | 5% |  | 0.01% |  |
| output laser power | 0.01 |  | 0.000195 |  |
| energy per pulse | 0.2 | uJ | 0.195 | uJ |
| photons per pulse | 5.35E+11 |  | 5.07E+11 |  |
| input beam diameter | 1 | mm | 2 × 4 | mm |
| tube lens magnification | 40 |  | 40 |  |
| Magnified beam diameter at camera | 40 | mm | 120 | mm |
| photon areal flux | 4.26E+14 | photons/m² | 4.48E+13 | photons/m² |
| pixel size | 5 | μm | 3.45 | μm |
| photons per pixel per pulse | 10600 | photons | 534 | photons |
| camera frame rate | 3300 | fps | 60 | fps |
| optical efficiency | 80% |  | 33% |  |
| camera exposure time | 300 | μsec | 17 msec | sec |
| pulses per exposure | 15 |  | 16 |  |
| total photons per exposure | 130,000 |  | 2,900 |  |
| Total photons per second | 4.26E+08 |  | 1.76E+05 |  |
| Max estimated SNR in 1 sec | 20,600 |  | 420 |  |

The following is a summary of some key factors supporting the higher photon flux of the current embodiment. In one embodiment, the probe source is a diode pumped solid state laser, 532 nm wavelength with at least 200 mW of optical power. Such lasers are available for example from Cobolt (Hubner) and Coherent. The lasers may be continuous wave (CW) or pulsed. In the case of CW laser, a modulator may be used to gate the probe pulses to be at a desired delay time after the start of the IR pulses. While the probe source used in Tamamitsu had a pulse limit of 130 nsec, the use of a CW laser with an electro-optic modulator provides essentially unlimited pulse duration up to the repetition rate of the IR source. For the table above, an IR pulse rep rate of 50 kHz was chosen, though rates up to a few MHz are also available, for example using quantum cascade laser sources from Daylight Solutions or Block Engineering. Suitable electro-optic modulators, such as Pockels cells and drive electronics are available from vendors like Eksma Optics, ConOptics, G&H and others. A significant advantage of the use of a diode pumped solid state laser with a Pockels cell is that this arrangement can achieve very small focused spots with high optical throughput. DPSS lasers from Cobolt for example have a small round beam and laser beam quality factor $M^2$ of less than 1.1, compared to elliptical beams produced by many diode lasers. This allows much more efficient optical coupling for example through spatial filters and through relay optics. Another critical factor is providing enough photons at the camera to be above the dark current noise and pixel shot noise. For detection of small changes like the photothermal modulations discussed herein, it is desirable to have enough light per exposure to work near the saturation limit of the camera. Even with a frame rate of around 60 frames per second, the Tamamitsu approach is estimated to have of order 3000 photons per exposure. The noise goes like the square root of the number of photons, so this would provide a best case single frame SNR of $$\frac{3000}{\sqrt{3000}} = 54.$$

By comparison, me current embodiment could achieve a single frame SNR as high as $$\frac{130000}{\sqrt{130000}} = 360.$$

Additionally, the current embodiment can capture many more frames per second. In one second, the current embodiment can co-average 3300 or more frames, leading to a further SNR improvement of 57×, for an SNR in one second of 57×360=20,600. By comparison, the Tamamitsu limit of 60 frames per second only provides ~7.7×SNR improvement or an overall SNR of 54×7.7=420. In practice, however, the Tamamitsu paper reported out significantly worse results than this, achieving a SNR of around 5 for their final photothermal detection sensitivity in a 1 second exposure. Two key factors that also contribute to the ability of the current embodiment of achieving much higher SNR are the ability to use high frame rate cameras based on high optical throughput and the ability to perform high speed calculations of the photothermal phase change. Both of these will be discussed later in this specification.

FIG. 2 illustrates a portion of the optical paths of FIG. 1 in more detail. Specifically, FIGS. 2A and 2B illustrate side by side the light paths for the illumination beams (FIG. 2A) and the imaging beam (FIG. 2B). FIG. 2 is arranged with the optical path in a linear configuration, i.e. oriented vertically for simplicity, i.e. omitting fold mirror 112 of FIG. 1. It should be understood that, in practice, the optical arrangement can be folded in two or three dimensions for a more compact arrangement if desired. Starting with the illumination path in FIG. 2A, an illumination beam 200 is used to illuminate a region 201 on sample 202. Illumination beam 200 can in some embodiments be substantially collimated and illuminate a wide area of sample 202, for example a region >25 microns, across, >50 microns across, 100 microns across, >500 microns across or even >1000 microns across. The illumination beam is arranged to at least partially overlap with IR beam 204, for example emitted by IR source 100 of FIG. 1. IR beam 204 is used to excite resonances in the sample, for example associated with molecular vibrations. Illumination probe light 200 passing through sample 202 can be collected by focusing optic 206, e.g. a microscope objective, and focused to a point 208 resulting in an expanding beam 210 that strikes focusing optic 212, for example a microscope tube lens. Focus point 208 can be arranged to be at the focal distance of focusing optic 212 such that a collimated illumination beam 214 emerges downstream of focusing optic 212.

The re-collimated illumination beam 214 can be directed to anon-diffractive beam splitting element 216, for example a beam splitting prism like a Wollaston or Rochon prism. The center of the beam splitting element 216 can also be arranged to be at a conjugate focal plane of the sample 202 such that an image of the sample 215 is superimposed on the beam splitting element 216. (This will be described in more detail associated with FIG. 2B.) Beam splitting element 216 divides the illumination beam onto two paths 218 and 220, separated by an angle θ. In the example shown, one of the beams 218 is undeviated and the other beam 220 is deviated by the angle θ, as would be the case for using a Rochon prism. Alternately, a Wollaston prism can be used, which will deviate both beams by ±θ. In the case of a Rochon or Wollaston or similar polarization sensitive beam splitter, the two beams that emerge will have substantially orthogonal polarization. Both beams 218 and 220 are directed towards focusing optic 222, typically the first lens in a 4f relay system. Focusing optic 222 refocuses the transmitted beams 224 and 240 to focused points 226 and 242 respectively. At the focus of one of the beams a spatial filter 228 is placed. The spatial filter is sized to essentially erase all information about the sample from the beam, producing an essentially featureless plane wave beam 230 that will form a reference beam for the interference. The other beam 242 optionally passes through a polarization rotator 244, for example a half wave plate, return transmitted beam 246 to a polarization that is matched with reference beam 230 such that they will interfere. Both beams 230 and 246 are directed through a final focusing optic 232, e.g. the $2^{nd}$ lens of a 4f relay system. Focusing optic 232 recollimates the illumination beams into beams 234 and 248. As mentioned previously, reference beam 234 is an essentially featureless plane wave while beam 238 carries an imprint of the sample. Both beams are interfered at an angle (e.g. the angle θ) to produce an image interferogram at the surface 236 of wide area detector 238, typically a camera or other array sensor.

FIG. 2B illustrates the optical path of the imaging beams using the same optical layout of FIG. 2A. In this case, consider the light that is scattered from a single image point 249 on sample 202. The scattered light 250 emerging from a single image point 249 on sample 202 is collected by the same focusing optic 206 described in FIG. 2A, e.g. a microscope objective. Since the sample is typically placed at the focal distance of focusing optic 206, the imaging beam 251 emerging from focusing optic 206 will be substantially collimated. The collimated beam 251 is directed to focusing optic 212 (e.g. a microscope tube lens) which then refocuses the transmitted beam 252 to a point 253. And in turn each other image point in sample 202 that is within the field of view of the objective 206 will be focused to a corresponding point by tube lens 212 creating a magnified image 215 at the tube lens focus. As described above associated with FIG. 2A, the non-diffractive beam splitting element 216 is placed at or near this focus to create two emerging beams 254 and 256 separated by an angle θ. One of the beams, in this case beam 258 is arranged to strike a spatial filter 228 with a small aperture. The spatial filter 228 will typically have a small hole, e.g. of order25 microns, thus permitting almost none of the imaging beam to pass through, illustrated by the absence of an imaging beam past the spatial filter 228. (The details of the sizing of the spatial filter depend on the size of the input probe beam and the focal lengths of the focusing optics used, including for example the magnification created by the objective, tube lens and the 4f optical system.) Note that some light does in fact pass through this spatial filter, as illustrated in FIG. 2A, but only a portion of the undeviated illumination light, whereas the vast majority of the imaging/scattered light is blocked. On the other hand, the deflected beam 260 transits on a path with no spatial filter, thus preserving the image information from the scattered light on this second path. Beam 260 optionally passes through a polarization rotator 244 and neutral density filter 245 as described with FIG. 2A. The image beam 262 is then refocused by focusing optic 232 onto the surface 236 of wide area detector 238, e.g. at the surface of a camera. The interference of the imaging beam 264 with reference beam 234 of FIG. 2A and with the illumination beam 248 creates an interferogram on the surface 236 of the camera 238. In the absence of any scattering by the sample, there will be no imaging beam 264 and the resulting interferogram will comprise essentially parallel lines with consistent fringe spacing. In the case that light is scattered by the sample, beams 248 and/or 264 will carry imprints of the sample that will result in a deviation of the interference fringes. These deviations can be analyzed to make an optical phase map of the sample. Further, these phase maps can be made with and without IR illumination, for example by pulsing or otherwise modulating IR beam 204 that at least partially overlaps with the illumination beam 200 and imaging beam 250 and analysis of shifts in the fringe pattern can be used to determine a signal indicative of the IR absorption by the sample. Note that in FIGS. 1, 2A and 2B, the sample and reference paths can also be reversed, e.g. such that the deflected beam passes through the spatial filter and becomes the reference beam. In some embodiments, it can be preferential that both beams are equally deflected in opposite directions, as in the case of a Wollaston prism. This can be advantageous as it ensures that both sample and reference beams are substantially the same path length, which can be desirable when using an illumination source with low coherence length. Additional compensation optics (not shown) can also be placed in the beam path to account for any phase differences associated with items in one path, e.g. the polarization rotator 244 and neutral density filter 245. These can be for example pieces of glass with thickness and index chosen to provide a similar optical path length difference as any optical components placed in the other path.

Phase Reconstruction and Differential Phase Calculation

There are a variety of ways to calculate the local phase from this interferogram and several have been described in the literature of quantitative phase imaging (QPI), including the use of Fourier transforms (Mitsuo Takeda, Hideki Ina, and Seiji Kobayashi, "Fourier-transform method of fringe-pattern analysis for computer-based topography and interferometry," J. Opt. Soc. Am. 72, 156-160 (1982), https://doi.org/10.1364/JOSA.72.000156), a Hilbert transform (Takahiro Ikeda, Gabriel Popescu, Ramachandra R. Dasari, and Michael S. Feld, "Hilbert phase microscopy for investigating fast dynamics in transparent systems," Opt. Lett. 30, 1165-1167 (2005), https://doi.org/10.1364/OL.30.001165, and U.S. Pat. No. 8,772,693), and derivative methods (Basanta Bhaduri and Gabriel Popescu, "Derivative method for phase retrieval in off-axis quantitative phase imaging," Opt. Lett. 37, 1868-1870 (2012) https://doi.org/10.1364/OL.37.001868), each incorporated by reference.

In the case of combining infrared spectroscopy with a quantitative phase imaging (QPI) technique, it is desirable to rapidly calculate the difference in the measured phase with and without the presence of IR light. For example two images can be obtained, one with the IR light on and another with the IR light off. Then both images can be analyzed to reconstruct two phase images with and without IR light. Then the two images are subtracted and the difference in the two phase images is indicative of the IR absorption by the sample. To achieve high signal to noise and/or high measurement throughput, it can be desirable to use cameras or other sensor arrays that can support high frame rates, for example >1000 frames/second, >10,000 frames per second or even >100,000 frames per second. Some of the approaches used within the QPI community for computing local phase from the image interferograms can be computationally intensive and may be challenging to implement at high camera frame rates that are desirable for wide field OPTIR techniques. A highly efficient technique is outlined in a following section that supports rapid measurements of the phase difference induced with IR absorption by the sample.

First, consider Eq 1: rewritten here for a single x,y point:

$$I=I_r+I_s+\sqrt{I_rI_s} \cos(2k\times\sin \theta+\phi)$$  Eq. 3:

Eq. 3 suggests a generally oscillatory waveform via the term $\cos(2 k\times\sin \theta)$ accompanied by a DC offset set by $I_r+I_s$. The optical phase $\phi$ introduced by the sample causes variations in the period of the oscillatory behavior of the interferogram. Below is described an efficient method to extract both the DC offset and the optical phase $\phi$.

FIG. 3 illustrates a method of rapidly calculating the optical phase from an interferogram. FIG. 3A illustrates a portion of a row 300 of sensors in a sensor array, e.g. pixels in a camera based detector. Example pixels are labeled 301, 302, 303, and 304. FIGS. 3B and 3C illustrate cross-sections of interferograms 305b and 305c that are incident on different rows the sensor array surface, e.g. on different rows on a camera sensor chip. In practice, the sensory array may have hundreds or even thousands of pixels in each row and column. The interferograms 305b and 305c may have different relative phase relationships to the grid of camera pixels, for example due to optical phase differences in the regions imaged to the different rows. It is then the object to calculate the relative phase differences from the pixel intensities. In one embodiment, the spacing of the pixels and the angle of the interferogram is arranged such that there is a difference of roughly 90° between adjacent pixels. Alternately, it can be arranged to have a 90° phase difference over N pixels, where N is an integer. E.g. bins of multiple pixels can be selected with an average phase difference of 90° between bins. The 90° phase difference being referred to here is not the optical phase change due to the sample, but rather the phase that is accumulated in the lateral direction due to the reference and sample waves interfering at an angle, i.e. the (2k×sin θ) term in the cosine of Eq. 3. So specifically, the optical system is arranged such that:

$$2kN\Delta x \sin\theta = \frac{\pi}{2}$$  Eq. 4 where $\Delta x$ is the distance between pixels, i.e. the pixel size. This condition can be met by arranging suitable selection of the camera pixel size, magnification of the 4f system and tube lens, wavelength, and interfering beam angle θ. FIG. 3 illustrates the condition where N=1, i.e. each camera pixel advances the phase of the 2k×sin θ term by 90° (π/2). The intensity of light from the interferogram captured by the camera pixels 301-304 is indicated by values $I_1, I_2, I_3$ and $I_4$. These values will be used to calculate the optical phase $\phi$. The optical system is also arranged with sufficient magnification such that there are multiple camera pixels per resolution element in the microscope. In this case the optical phase $\phi$ has a roughly constant value over a number of adjacent pixels as do the sample and reference intensities $I_r$ and $I_s$. Specifically, it is assumed that these values are roughly constant for at least pixels 301-303, or alternately 301-304. In this case, equations for the intensities $I_1, I_2, I_3$ and $I_4$ can be written as follows:

$$I_1=I_r+I_s+\sqrt{I_rI_s} \cos(\phi)$$  Eq: 5

$$I_2=I_r+I_s+\sqrt{I_rI_s} \cos(90°+\phi)$$  Eq: 6

$$I_3=I_r+I_s+\sqrt{I_rI_s} \cos(180°+\phi)$$  Eq. 7:

$$I_4=I_r+I_s+\sqrt{I_rI_s} \cos(270°+\phi)$$  Eq. 8:

Equation 5 was written assuming x=0, and then Eqs. 6-8 advance the phase of the 2 k×sin θ term in Eq. 3 by a 90° (π/2) increment for each pixel. Using trigonometric identities, these equations can be rewritten:

$$I_1=I_r+I_s+\sqrt{I_rI_s} \cos(\phi)$$  Eq. 9:

$$I_2=I_r+I_s-\sqrt{I_rI_s} \sin(\phi)$$  Eq. 10:

$$I_3=I_r+I_s-\sqrt{I_rI_s} \cos(\phi)$$  Eq. 11:

$$I_4=I_r+I_s+\sqrt{I_rI_s} \sin(\phi)$$  Eq. 12:

Three or more of these equations can be combined to solve for the optical phase $\phi$. For example, adding Eqs. 9 and 11 results in:

$$I_1+I_3=2(I_r+I_s)$$  Eq. 13:

And then:

$$(I_r + I_s) = \frac{I_1 + I_3}{2}$$  Eq. 14

Rearranging Eqs. 9 and 10 give $$\cos(\phi) = \frac{I_1 - (I_r + I_s)}{\sqrt{I_rI_s}}$$  Eq. 15

$$\sin(\phi) = -\frac{I_2 - (I_r + I_s)}{\sqrt{I_rI_s}}$$  Eq. 16

Eq. 16 can be divided by Eq. 17 to get:

$$\tan(\phi) = -\frac{I_2 - (I_r + I_s)}{I_1 - (I_r + I_s)} \qquad \text{Eq. 17}$$

Plugging in Eq. 14 into Eq. 17 gives:

$$\tan(\phi) = -\frac{I_2 - \left(\frac{I_1 + I_3}{2}\right)}{I_1 - \left(\frac{I_1 + I_3}{2}\right)} = -\frac{2I_2 - I_1 - I_3}{I_1 - I_3} \qquad \text{Eq. 18}$$

Eq. 18 can then be solved for the phase $\phi$:

$$\phi = \operatorname{atan} 2(2I_2 - I_1 - I_3, I_3 - I_1), \qquad \text{Eq. 19:}$$

where atan 2 is the two-argument inverse tangent. Other forms of the inverse tangent may also be used. Phase unwrapping techniques can be applied to remove any discontinuities in the phase. Note that Eq. 19 calculates a signal indicative of the phase with as few as 3-pixel intensity values and thus can be computed very rapidly. More noise rejection can be achieved by using more pixels, for example binning pixels vertically (in the y direction). More accurate measurements of the DC offset ($I_r + I_s$) can also be obtained by using for example other combinations of Eq. 9-12, for example using the sum of Eqs. 10 and 12 in addition to Eqs. 9 and 11. As mentioned previously, it is also possible to have the phase increment between pixels to be less than 90° to be able to bin pixels in the X direction for measurements of the $I_1$-$I_4$ values.

A differential photothermal signal can be constructed by measuring the change in the phase $\Delta\phi$ with the IR light on vs. off. That is:

$$\Delta\phi = \phi_{IR\,on} - \phi_{IR\,off} \qquad \text{Eq. 20:}$$

This quantity $\Delta\phi$ is then indicative of the change in optical phase resulting from IR absorption by the sample. The quantity $\Delta\phi$ can then be plotted as a function of position for one or more IR excitation wavelengths to produce a map indicative of the distribution of different chemical species. The quantity $\Delta\phi$ can also be plotted as a function of different excitation wavelengths (or equivalently wavenumber) to produce a signal indicative of the IR absorption properties of a sample, for example an infrared absorption spectrum.

Figure 4:
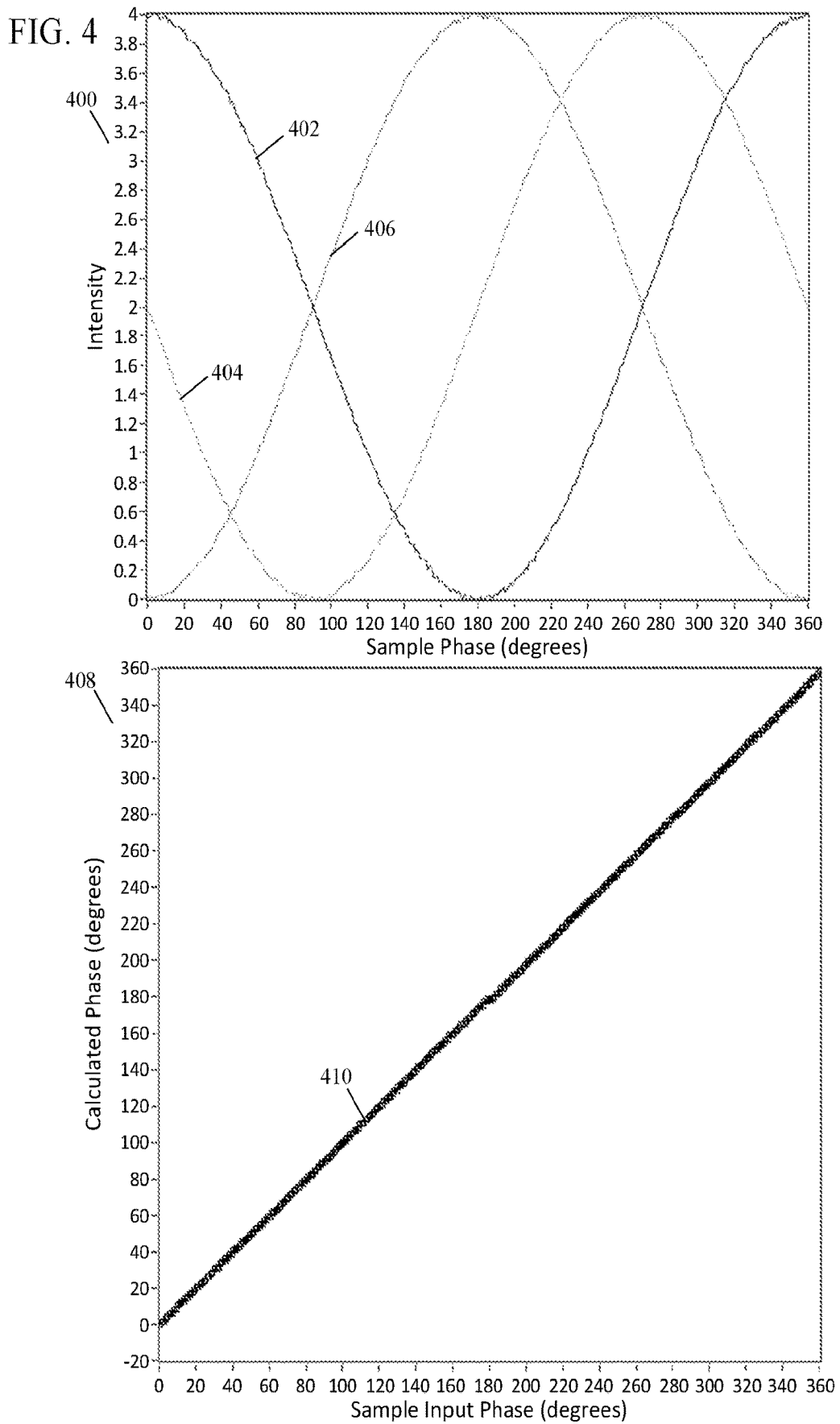
FIG. 4 illustrates the results of a calculation performed according to the techniques described in FIG. 3.

FIG. 4 shows an illustration of results calculated using the phase calculation described above. Data was simulated using one pixel per 90° of phase shift per camera pixel from the 2 k× sin θ term of Eq. 3. Plot 400 shows the intensities 402, 404 and 406 of adjacent pixels with the 90° phase shift while varying the input optical phase. (As described earlier, instead of individual pixels, multiple pixels can be binned together in the X and or Y directions as long as the two sets of pixels that are binned together in the X axis an average phase difference of 90° in the 2 k× sin θ term of Eq. 3.) As can be seen this arrangement causes traces 402, 404 and 406 have a quadrature relationship to each other (i.e., these two traces are also 90° out of phase). Plot 408 shows the reconstruction of the phase $\phi$ from the three intensity values for each input optical phase in plot 400, using Eq. 19 above. Trace 410 shows a substantially accurate reconstruction of the input phase. This simulation was performed with a peak-to-peak noise amplitude of 4% for each camera pixel. Improvements in SNR can be achieved by co-averaging the results of multiple camera frames and/or by binning more pixels as described above.

The following section outlines another way to extract the signal indicative of IR absorption. In this case it is assumed that at any point on the sample the optical phase has a DC value $\phi_0$ that is perturbed by IR absorption changing the DC phase by a small increment $\delta$. That is:

$$\phi = \phi_0 + \delta, \text{ where } \delta \text{ is small.} \qquad \text{Eq. 21:}$$

Plugging this into the $\cos(2k\times\sin\theta + \phi)$ term of Eq. 3 results in:

$$\cos(2k\times\sin\theta + \phi_0 + \delta) \qquad \text{Eq. 22:}$$

Next, the compound angle formula is applied $\cos(A+B) = \cos A \cos B - \sin A \sin B$, where $A = 2k\times\sin\theta + \phi_0$ and $B = \delta$. This results in:

$$\cos(2k\times\sin\theta + \phi_0 + \delta) = \cos(2k\times\sin\theta + \phi_0)\cos\delta - \sin(2k\times\sin\theta + \phi_0)\sin\delta \qquad \text{Eq. 23}$$

Using small angle expansions $\cos\delta \approx 1$ and $\sin\delta \approx \delta$, Eq. 23 can be rewritten as:

$$\cos(2k\times\sin\theta + \phi_0 + \delta) = \cos(2k\times\sin\theta + \phi_0) - \sin(2k\times\sin\theta + \phi_0)\delta \qquad \text{Eq. 24:}$$

This in turn can be solved for $\delta$ to give:

$$\delta = \frac{\cos(2kx\sin\theta + \phi_0 + \delta) - \cos(2kx\sin\theta + \phi_0)}{-\sin(2kx\sin\theta + \phi_0)} \qquad \text{Eq. 25}$$

Now consider the intensities of the camera pixels of FIG. 3A in the conditions of the IR light on ("hot", subscript h) and with the IR light off ("cold", subscript c), using Eqs. 9-12 starting with x=0.

$$I_{1h} = I_r + I_s + \sqrt{I_r I_s}\cos(\phi_0 + \delta) \qquad \text{Eq. 26:}$$

$$I_{1c} = I_r + I_s + \sqrt{I_r I_s}\cos(\phi_0) \qquad \text{Eq. 27:}$$

$$I_{2c} = I_r + I_s + \sqrt{I_r I_s}\sin(\phi_0) \qquad \text{Eq. 28:}$$

$$I_{3c} = I_r + I_s - \sqrt{I_r I_s}\cos(\phi_0) \qquad \text{Eq. 29:}$$

$$I_{4c} = I_r + I_s - \sqrt{I_r I_s}\sin(\phi_0) \qquad \text{Eq. 30:}$$

Subtracting Eq: 27 from Eq 26 results in:

$$I_{1h} - I_{1c} = \sqrt{I_r I_s}(\cos(\phi_0 + \delta) - \cos(\phi_0)), \qquad \text{Eq. 31:}$$

which is proportional to the numerator in Eq. 25. Subtracting Eq. 30 from Eq. 28 gives:

$$I_{2c} - I_{4c} = 2\sqrt{I_r I_s}\sin(\phi_0), \qquad \text{Eq. 32:}$$

which is proportional to the denominator in Eq. 25. Dividing Eq. 31 by Eq. 32 gives:

$$\frac{I_{1h} - I_{1c}}{I_{2c} - I_{4c}} = \frac{\sqrt{I_r I_s}(\cos(\phi_0 + \delta) - \cos(\phi_0))}{2\sqrt{I_r I_s}\sin(\phi_0)} = \frac{(\cos(\phi_0 + \delta) - \cos(\phi_0))}{2\sin(\phi_0)} \qquad \text{Eq. 33}$$

Which is the same as Eq. 25 except for a factor of 2 and a minus sign. Making these adjustments gives:

$$\delta = 2\frac{I_{1h} - I_{1c}}{I_{4c} - I_{2c}} \qquad \text{Eq. 34}$$

Equation 34 shows how a signal indicative of IR absorption $\delta$ can be calculated extremely rapidly using only the intensities of nearby pixels under the hot/cold state and with extremely simple computation. This approach provides the means to use sensitive interferometric techniques that provide in fact a quantitative measurement of the differential optical phase change due to IR absorption, but without the need to perform a separate quantitative measurement of the DC optical phase, a task that can be computationally intensive. The approach leading to Eq. 34 also eliminates the need to be concerned about phase discontinuities or apply phase unwrapping techniques. This simplification occurs because of the use of the small angle approximation that the differential phase change δ is small. This approximation, however, is justified in almost all cases because of the nature of the photothermal effect. Typical materials introduce a change in index of refraction of around $10^{-4}/°$ C. of temperature change. With a sample temperature increase of even 10° C., the max sample index change is around $10^{-3}$. The phase change is also commensurately small. Consider the previous example of a biological cell with an optical path change of around 0.125 um, resulting in a DC phase change of ~90° or π/2. If the entire cell absorbed IR light and heated up by 10° C., the resulting change in optical phase would be around π/2×1E-3=0.001570796. The small angle approximation is appropriate since sin(0.001570796)=0.001570796, i.e. sin δ=δ to very high accuracy in this case. For thinner samples, sub-cellular components, and/or smaller temperature rises (desirable for biological samples), the differential phase change will be even smaller. So in almost cases the small angle approximation is appropriate and Eq. 34 is applicable. Note that other formulations of pixel intensities can also be used, for example binning multiple pixels in the X and or Y directions as described previously. Signal to noise can be improved by coadding/coaveraging multiple camera frames and/or multiple calculations of Eq. 34. Note also that Eq. 30 contains the same cosine term as Eq. 27, so the $I_{3h}$ and/or $I_{3c}$ terms can be use in addition to or in place of the $I_{1h}$ and $I_{1c}$ terms of Eq. 34.

The approach described above can also apply if instead of measuring adjacent pixels with 90° incremental phase shifts, the intensities can be measured at the same pixel but at successive optical path differences, for example at three optical phases 90 degrees apart. For example, a transmissive variable phase retarder can be included in the path of one or more of the reference beam and sample beam to introduce successive phase shifts. Suitable variable retarders are sold for example by Thorlabs, Edmund Optics, Meadowlark Optics and others. For example, one hot frame and one cold frame can be measured with 0 degrees phase shift to obtain the intensities of Eq. 26 and 27 and then two cold frames at 90° and 270° can be measured to obtain the intensities of Eqs. 30 and 31. Then these intensities can be combined to calculate the differential phase according to Eq. 34. This approach avoids the need to arrange a specific phase relationship between adjacent pixels.

The signals indicative of IR absorption δ can be calculated extremely quickly for example using Eq. 34, because of the computational simplicity. This efficient computation is critical to enabling high camera frame rates and high signal to noise ratios. More specifically, for continuous operation, the practical camera frame rate is constrained by how quickly the accompanying calculation of differential photothermal phase change δ can be performed. The embodiments described herein can achieve calculation efficiencies sufficient to permit camera frame rates in excess of 100 frames per second (fps), >1,000 fps or even >10,000 fps. The table below summarizes benchmark computation times and enabled frame rates for the computation of Eq. 34 vs. other computation algorithms common in quantitative phase imaging as described in the QPI literature, for example the Hilbert Transform and Fast Fourier Transforms (FFT), as described in Mitsuo Takeda, Hideki Ina, and Seiji Kobayashi, "Fourier-transform method of fringe-pattern analysis for computer-based topography and interferometry," J. Opt. Soc. Am. 72, 156-160 (1982), https://doi.org/10.1364/JOSA.72.000156), and Takahiro Ikeda, Gabriel Popescu, Ramachandra R. Dasari, and Michael S. Feld, "Hilbert phase microscopy for investigating fast dynamics in transparent systems," Opt. Lett. 30, 1165-1167 (2005), https://doi.org/10.1364/OL.30.001165, and U.S. Pat. No. 8,772,693.

Benchmark calculations were performed with the different algorithms using LabVIEW on a desktop computer using a Intel Xeon CPU ES-1607 v2 running at 3.00 GHz using 512×512 pixels. The results are shown in the table below.

| Algorithm | 512 × 512 pixels | |
| --- | --- | --- |
|  | Calculation time | Equivalent frame rate |
| FFT | 22.9 msec | 44 fps |
| Hilbert | 15.2 msec | 66 fps |
| Eq. 34 | 1.4 msec | 714 fps |

It is apparent that the computational simplicity of Eq. 34 enables much shorter computation times and much higher frame rates. If a smaller number of pixels are uses, even higher frame rates can be achieved. For example, using 128×128 pixels, the computation time for Eq. 34 is 0.03 msec, providing an equivalent frame rate up to 33,333 fps. The faster computation time and faster frame rates have a significant impact on signal to noise ratio. For example, consider a one second acquisition time, where the Hilbert transform would support a maximum of 66 camera frames acquired, whereas Eq. 34 would enable 714 frames. The SNR generally improves with the square root of the number of co-averaged or co-added camera frames. While the Hilbert transform would only support an SNR improvement of $\sqrt{66}$=8.1, Eq. 34 provides an SNR improvement of $\sqrt{714}$=26.7. Using 128×128 pixels which enables the 33,333 fps, provides an SNR improvement of $\sqrt{33,333}$=182. These high frame rates are also enabled by significantly higher optical throughput of the current embodiments, as described later.

Note that the calculation times in the table above can also be improved dramatically using a dedicated embedded processor, for example a field programmable gate array (FPGA) which can perform many pixel calculations in parallel. Camera sensor systems can be purchased or assembled with on-board FPGAs. For example the IL5 high speed camera from Fastec has an onboard FPGA that can be programmed to perform calculations like Eq. 34 and supports a camera frame rates of 3300 fps at 640×480 pixels and 6300 fps at 320×230 pixels. The MEMREMCAM HX-7s by nac Image Technology supports frame rates as high as 12,000 fps for 640×480 pixels.

Figure 5:
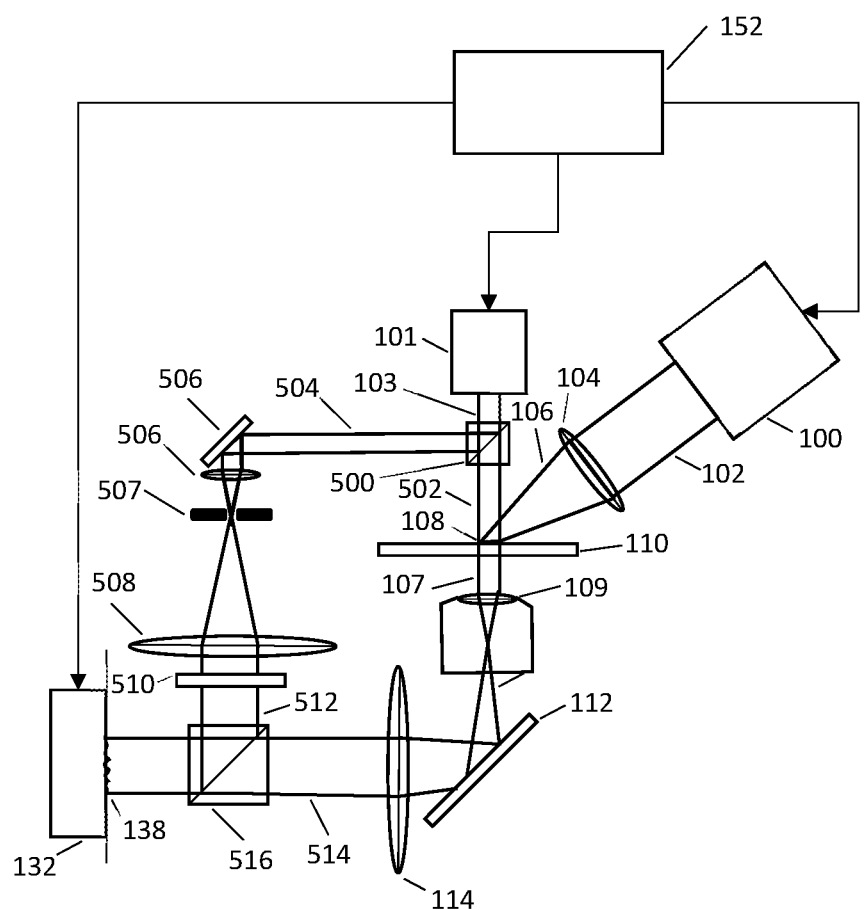
FIG. 5 is a schematic diagram of a high-performance wide field photothermal IR spectroscopy and imaging system employing a non-common path interferometer, according to an embodiment.

FIG. 5 shows an alternate embodiment of a wide field setup for OPTIR optical phase measurements. FIG. 5 is based on FIG. 1 and where identical numerical callouts are used the associated descriptions from FIG. 1 apply as appropriate. FIG. 5 shows the use of a non-common path Mach-Zender interferometer for wide field measurements of IR absorption by a sample. Mach-Zender approaches have been used for Quantative Phase Imaging as described for example by Christopher J. Mann, Lingfeng Yu, Chun-Min Lo, and Myung K. Kim, "High-resolution quantitative phase-contrast microscopy by digital holography," Opt. Express 13, 8693-8698 (2005), hereby incorporated by reference. In the embodiment of FIG. 5, probe beam 103 from probe beam source 101 is divided on two paths by beam splitter 500. One path 502 passes through the sample and objective as described with FIG. 1. A second portion of the beam that will serve as a reference beam is directed on an alternate path 504 where the beam is optionally turned by one or more mirrors 506. The reference beam is also optionally magnified and recollimated by focusing optics 506 and 508 (or any equivalent beam expansion scheme) such that the beam diameter is similar to that of collimated probe beam 115. The reference beam may also optionally pass through a spatial filter 507 to ensure that the reference beam is an essentially a featureless reference beam. The reference beam can optionally passes through a variable phase retarder 510 to adjust the relative phase of the reference beam relative to the sample beam. One or more of the sample and reference beam paths may also include a variable attenuator or neutral density filter to adjust the relative intensities on one or both arms. The reference beam 512 is then recombined with sample beam 514 at beam combiner 516. (Beam combiner 516 is generally just a beam splitter used in reverse.) The recombined sample and reference beams then interfere at the surface 138 of array detector (e.g., camera) 132. Note that the illumination beams are drawn in this case and that the sample image beam paths are more like FIG. 2B. The combination of the sample and reference beams at array detector 132 causes an interference pattern spread over the pixels of the detector. In the case that the two beams are collinear, there will be a roughly constant phase on a featureless sample. On a sample with scattering/phase retarding objects, interference patterns will form on the sample indicative of the optical phase difference between the sample and reference paths, i.e. capturing an imprint of the phase distortions introduced by the sample. In the case that the sample and reference beams are interfered at a small angle, an oscillating interferogram similar to 146 in FIG. 1 will be superimposed on the sample induced phase distortions. In either case, the phase reconstruction processes described above can be applied. In the case that the sample and reference beams are interfered at an angle, Eqs. 19/20 and/or Eq. 33 can be applied where the intensities $I_1$ through $I_4$ represent the intensities on neighboring pixels or bins of pixels with a 90° phase offset. In the case that the sample and reference beams are interfered with parallel beams, the equations can be applied where the intensities $I_1$ through $I_4$ represent the intensities of the same pixel or bins of pixels, but measured at successive different optical phase delays, such as by changing the phase delay of variable phase retarder 508. In addition it is possible to vary the phase relationship by moving one or more of the mirrors in the reference path to change the reference path length. It is also possible to rotate one or more mirror, for example 506 and/or 510 to change the angle of interference. Variable attenuators (not shown) may be included in the sample and/or reference beam to substantially match the sample and reference beam intensities.

Figure 6:
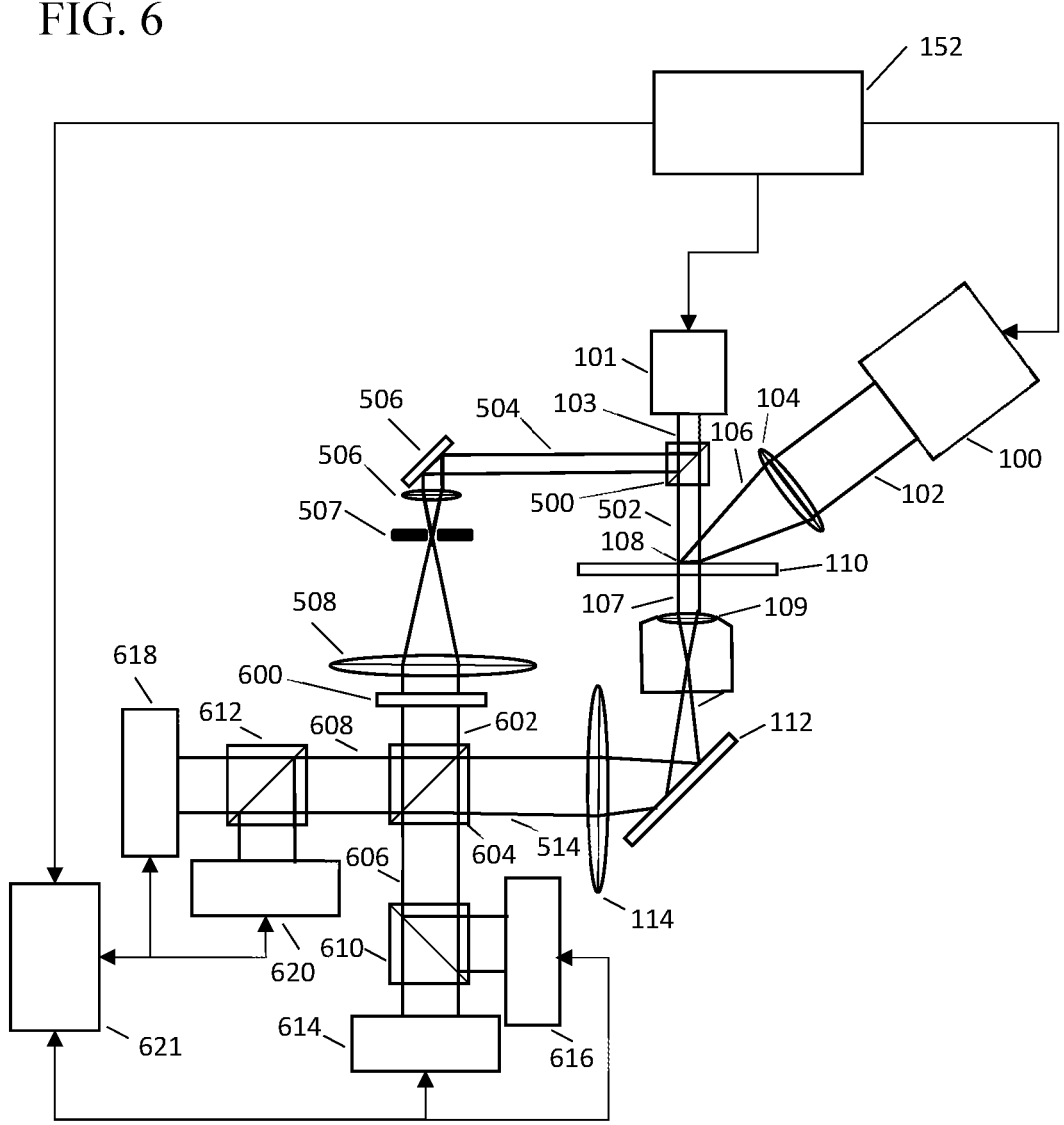
FIG. 6 is a schematic diagram of a high-performance wide field photothermal IR spectroscopy and imaging system employing a non-common path quadrature interferometer, according to an embodiment.

FIG. 6 shows an alternate embodiment of a wide field setup for OPTIR optical phase measurements. FIG. 6 is based on FIGS. 1 and 5 and where identical numerical callouts are used the associated descriptions from FIGS. 1/5 apply as appropriate. FIG. 6 illustrates a multi-camera arrangement for wide-field quadrature phase detection. The beam paths of FIG. 6 proceed the same as FIG. 5 until the reference beam emerges from focusing optic 508, at the second lens in the beam expander in the reference arm. A quarter wave plate 600 is inserted into the reference arm to create a circularly polarized reference beam 602. This beam recombines with the sample beam 514 in beam splitter 604 typically a non-polarizing beam splitter. The recombined sample and reference beams are divided by the beam splitter on two different paths 606 and 608. In each of these paths are polarizing beam splitters 610 and 612 that divide the combined reference and sample beams onto four paths to up to four cameras 614, 616, 618, 620. Interference patterns appear at each of these four cameras surfaces. The arrangement of the quarter wave plate 600 and the polarizing beam splitter ensures that each camera captures the interferograms at different phases, substantially 90° apart. Camera frames can be captured synchronously with synchronized frame grabber 621 ensuring high temporal correlation between the different cameras. Capturing synchronous frames substantially eliminates environmental concerns about vibration and/or temperature drift between the sample and reference paths. Since all frames are capture simultaneously any overall phase shifts can readily be determined using the signals from the multiple cameras. The quantitative phase and/or the differential phase due to IR absorption can be determined using the methods described about, but in this case the $I_1$, $I_2$, $I_3$, and $I_4$ refer to the intensities of matching pixels on the four cameras, i.e. $I_1$ corresponds to a pixel intensity on camera 1, $I_2$ the corresponding pixel intensity on camera 2, etc., where each of the cameras are 90° apart in optical phase. Such multi-camera quadrature approaches are described for use with differential interference contrast microscopy as described for example in (1) William C. Warger II, Judith A. Newmark, Bing Zhao, Carol M. Warner, and Charles A. DiMarzio "Accurate cell counts in live mouse embryos using optical quadrature and differential interference contrast microscopy", Proc. SPIE 6090, Three-Dimensional and Multidimensional Microscopy: Image Acquisition and Processing XIII, 609009 (23 Feb. 2006); https://doi.org/10.1117/12.644922; and (2) Willie S. Rockward, Anthony L. Thomas, Bing Zhao, and Charles A. DiMarzio, "Quantitative phase measurements using optical quadrature microscopy," Appl. Opt. 47, 1684-1696 (2008), both incorporated by reference.

Figure 7:
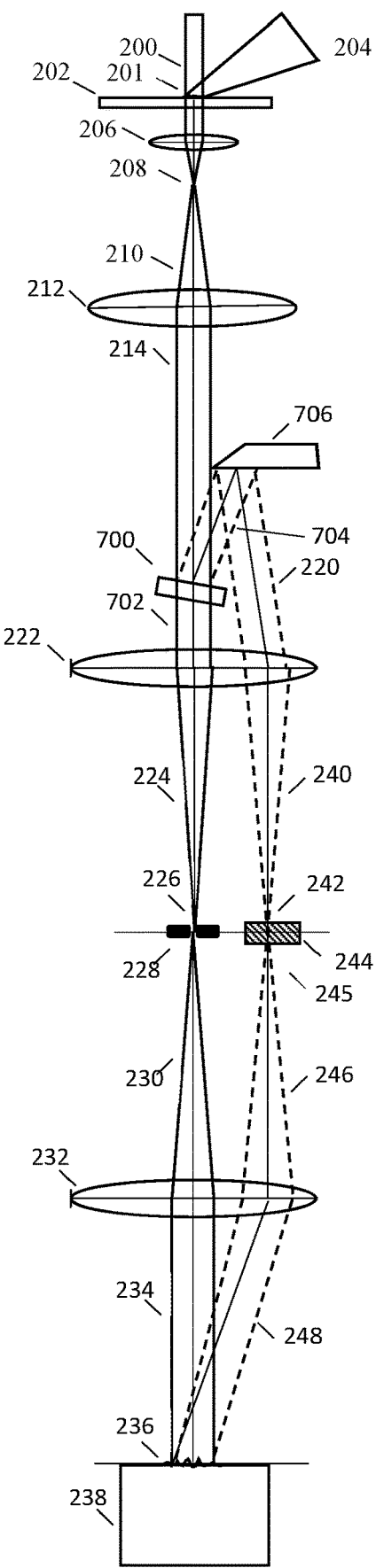
FIG. 7 is a schematic diagram of another system for a high-performance wide field photothermal IR spectroscopy and imaging using a non-diffractive beam splitter, according to an embodiment.

FIG. 7 illustrates an alternative embodiment of optics for wide field optical phase based OPTIR. FIG. 7 is based on FIG. 2A and where identical numerical callouts are used, the discussion associated with FIG. 2A applies as appropriate. FIG. 7 illustrates an alternative means of dividing the sample and reference beam onto two paths. FIG. 7 is the same as FIG. 2A in that the sample 202 is illuminated by an IR beam 204 which excites molecular resonances in the sample which are read out by probe beam 200. Probe beam passes through sample 202 and transmitted and scattered light is collected by focusing optic 206. As before this beam is magnified by focusing optic 212, typically a microscope tube lens. The beam 214 emerging from the tube lens or other focusing optic is then incident on beam splitter 700. Unlike FIGS. 1-2, the beam splitter 700 in this case can be a non-polarizing beam splitter, for example simply a partially reflecting mirror that is inclined at a slight angle. One portion 702 of beam 214 is transmitted through beam splitter 700 while another portion 704 is diverted at twice the angle of the beam splitter. Beam 704 is then reflected by reflector 706, typically a "D-mirror" or pickoff mirror used to separate closely spaced beams. The net result is an angled beam 220 that is arranged at a deviated angle with respect to beam 702. These two beams propagate just as beams 218 and 220 in FIG. 2A until they are recombined at the surface 236 of array detector/camera 238. One other difference between the embodiment of FIG. 7 and FIG. 2A is that the embodiment of FIG. 7 does not require the polarization rotating element 244 of FIG. 2 since the two beams 702 and 704 are not separated by polarization and thus maintain the same polarization. The interferogram at surface 236 can then be analyzed to extract changes in phase due to IR absorption of the sample as described in the various algorithms above.

Figure 8:
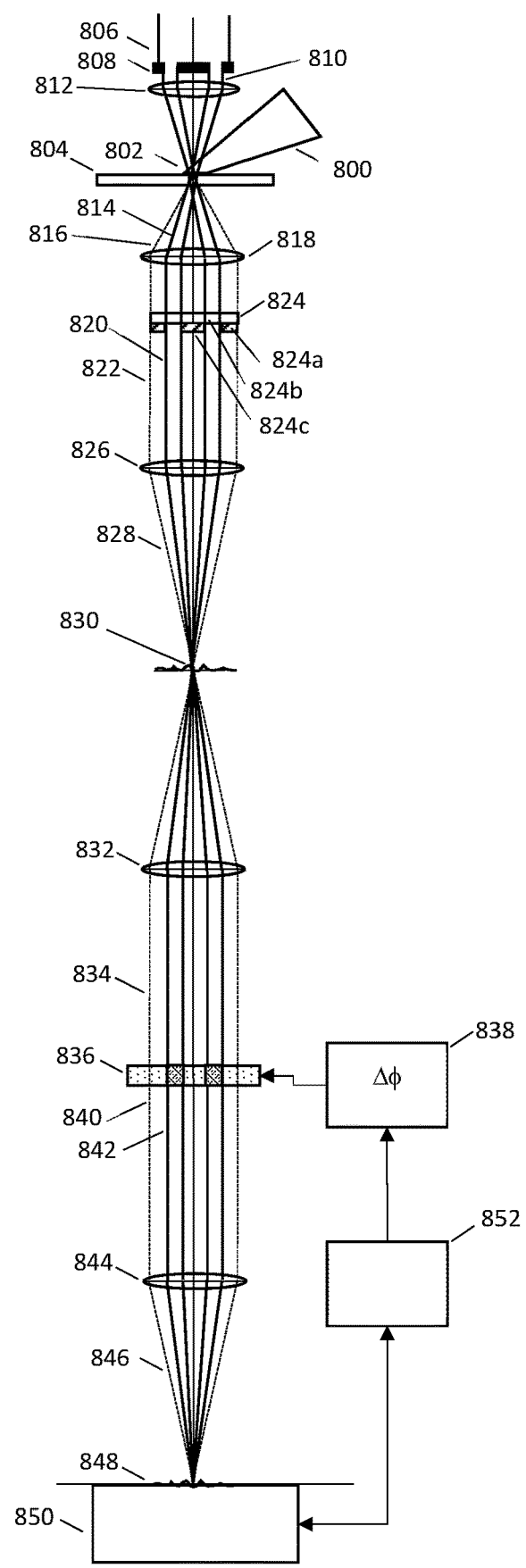
FIG. 8 is a schematic diagram of another system for a high-performance wide field photothermal IR spectroscopy and imaging using phase contrast microscopy with a spatial light modulator to overcome sensitivity variations, according to an embodiment.

FIG. 8 shows an alternative embodiment employing a modified form of phase contrast microscopy with dynamic phase adjustment to perform wide field measurements of infrared absorption by a sample. Infrared beam 800 is arranged to illuminate a region 802 of a sample 804, as described previously associated with FIG. 1 and other previous figures. A phase contrast microscope is arranged to illuminate a region of sample 804 at least partially overlapping with the IR illuminated region 802. Specifically, an illuminating probe beam 806 is passed through an annulus 808 that produces a ring of illuminating probe light 810. This light ring 810 is then focused by focusing optic 812, typically a microscope condenser to create a focused spot of probe light on the sample 804, at least partially overlapping with IR illuminated region 802. Probe light striking sample 804 then can take one of two paths. Probe light that is undeflected by the sample follows path 814, expanding again into a ring of light that mirrors the illumination light pattern. This is typically called the "direct" or "surround" light. In addition to the direct/surround light, a portion of the illuminating light is scattered by the sample through a wide array of angles. A portion of this scattered light is collected by focusing optic 818, typically a microscope objective. The cone of scattered light collected by optic 818 is indicated the dashed line labeled 816. Conventional phase contrast microscopy arranges to interfere the direct/surround light with the scattered light as described below. The transmitted direct light 814 and the scattered light 816 are collimated or otherwise refocused by optic 818 (e.g., the microscope objective) and then passed through a phase ring 824. Phase ring 824 is generally divided into regions with two different phase retardations. For example, regions 824a and 824c can have one retardation value and 824b can have a second retardation value. The difference in phase retardation is generally arranged to induce a 90° phase change between the direct/surround light 820 and the scattered light 822 that passes through the phase ring 824. Both the direct/surround light are then focused by focusing optic 826 (typically a microscope tube lens) to form an image 830 of the sample. At this image plane, the phase shifted direct/surround light interferes with the scattered light to produce brightness contrast depending on the phase shifts induced in the scattered light by the sample. Consider for example scattered light passing through a biological cell and incurring around 90° of phase retardation due to the difference in index of the cell vs the surrounding media as described previously. When the direct/surround light passes through thinner regions of the phase ring, its phase is advanced by roughly 90°, resulting in a total phase shift of ~180° between the direct/surround light and the scattered light. The 180° phase shift results in destructive interference, thus creating a dark image of the tops of the cells against a brighter background. Thinner regions of the cells will incur less of a phase change on the scattered beam, thus resulting in less destructive interference and causing these regions to be brighter. Note that the brightness of the image 830 does not have a simple relationship to the sample thickness. Very thin regions of a cell will be bright, thicker regions dark, but then even thicker regions can become bright again when the optical path difference exceed 90°. This leads to contrast inversions that is one source of phase contrast microscopy artifacts described in the background section. These contrast inversions, nonlinear sensitivity to thickness and other artifacts would cause significant problems interpreting infrared images and spectra if a camera sensor were placed at image plane 830. Specifically, the sensitivity of the IR absorption measurement would depend in a complicated way on the sample thickness. And for some thicknesses the sensitivity of the IR absorption measurement could in fact be zero. The rest of the optical path in FIG. 8 and the following description provides a mean to overcome this issue and provide uniform sensitivity independent of the optical path difference.

To understand the issue and its resolution in more detail, consider the brightness at a point in a phase contrast image. For the moment, consider just simple interference between the direct and scattered light. (Departures from this simple model will be discussed later.) The general form for the intensity of interfering waveforms is given by:

$$I = I_d + I_s + \sqrt{I_d I_s} \cos \phi \qquad \text{Eq. 35:}$$

Where in this case $I_d$ refers to the intensity of the direct light and $I_s$ is the intensity of the scattered light, and $\phi$ is the relative phase between these two waves. Now the phase ring 824 introduces a 90° phase difference between the two waves, so Eq. 35 can be rewritten as:

$$I = I_d + I_s + \sqrt{I_d I_s} \cos(\phi_s + 90°) = I_d + I_s - \sqrt{I_d I_s} \sin \phi_s \qquad \text{Eq. 36:}$$

Where $\phi_s$ is the phase difference induced by the sample. (Note that that in some forms of phase contrast microscopy, the phase on the direct light is retarded instead of advanced, resulting in a change of sign in the interference term.) In the case of photothermal excitation by absorption of IR light, the sample phase $\phi_s$ will have a constant DC term $\phi_0$, dependent on the index of refraction and thickness of the given region of the sample and a small change $\delta$ that results from IR absorption by the sample, i.e.:

$$\phi_s = \phi_0 + \delta \qquad \text{Eq. 37:}$$

Inserting this into Eq. 34 for the "hot frame" (e.g. IR beam on) gives:

$$I_h = I_d + I_s - \sqrt{I_d I_s} \sin(\phi_0 + \delta) \qquad \text{Eq. 38:}$$

Using the compound angle formula sin(A+B)=sin A cos B+cos A sin B, this results in:

$$I_h = I_d + I_s - \sqrt{I_d I_s}(\sin \phi_0 \cos \delta - \cos \phi_0 \sin \delta) \qquad \text{Eq. 39:}$$

Using small angle approximations described earlier for the small phase change $\delta$ gives:

$$I_h = I_d + I_s - \sqrt{I_d I_s}(\sin \phi_0 - \delta \cos \phi_0) \qquad \text{Eq. 40:}$$

And with no IR illumination, the "cold frame" intensity would be $$I_c = I_d + I_s - \sqrt{I_d I_s} \sin \phi_0 \qquad \text{Eq. 41:}$$

Subtracting the cold frame intensity (Eq. 41) from the hot frame intensity (Eq. 40) gives:

$$I_h - I_c = \sqrt{I_d I_s} \delta \cos \phi_0 \qquad \text{Eq. 42:}$$

This can be solved for the photothermal phase change $\delta$:

$$\delta = \frac{I_h - I_c}{\sqrt{I_d I_s} \cos \phi_0} \qquad \text{Eq. 43}$$

Eq. 43 illustrates the problem with simply placing a camera at image plane 830. The issue is that the sensitivity to measuring the photothermal phase change δ depends on the DC phase $\phi_0$. The cos $\phi_0$ term can vary between ±1 where the sensitivity depends on the thickness and index of refraction of the sample. Specifically, the DC phase change $\phi_0$ is given by:

$$\phi_0 = 2\pi(n_s - n_m)\frac{t_s}{\lambda} \qquad \text{Eq. 44}$$

where $n_s$ is the index of the sample, $n_m$ is the index of the surrounding media, $t_s$ is the sample thickness, and $\lambda$ is the wavelength of the illuminating probe beam. In the case of a biological cell accumulates a DC phase shift $\phi_0$ around 90° as discussed earlier, the cos $\phi_0$ term can be around zero, causing a singularity in the calculation of the photothermal phase change. Thus, placing a camera at sample image plane 830 with no other modifications would result in highly non-uniform sensitivity to the photothermal phase change δ.

To address this, a 4f relay system is included in FIG. 8 with a variable phase retarder to allow measurements at a plurality of phase values that will allow a continuous and consistent measurement of the photothermal phase change δ, for arbitrary values of the DC phase $\phi_0$.

A first relay focusing optic 832 is placed nominally at a distance corresponding to the focal length of optic 832, thus substantially collimating the direct/surround and scattered beams. The collimated beams then pass through a location addressable variable phase retarder 836, for example a spatial light modulator. An annular retardation pattern is programed onto the variable phase retarder, substantially matching the aspect ratios of the annular rings in phase ring 824. (Note that phase ring 824 can also be omitted and all phase adjustment can be provided by variable phase retarder 836.) The pattern and/or phase retardation amplitude is controlled by phase controller 838, for example by applying a pattern of different voltage levels to phase retarding elements of variable phase retarder 836. The direct and scattered beams 842 and 840 emerging from the variable phase retarder now have a new total DC phase difference equal to $\phi_0+\phi_r$ where $\phi_r$ is the phase change introduced by the retarder. Both beams are then refocused by second relay focusing optic 844 (the 2nd lens in the 4f relay system) and then focused to form an interference image 848 on the surface of camera 850. Note that the 4f phase retardation system can also be arranged in reflection. For example, phase retarder 836 can be a reflective spatial light modulator light a liquid crystal on silicon (LCOS) phase retarder. In this case the optical path of FIG. 8 would be folded, for example into a V-shaped configuration. Controller 852 may be used to synchronize phase adjustment steps with acquisition of image frames from camera 850. Phase controller 838 and controller 852 may also be integrated into a single control unit in some embodiments. In embodiments, any other actuatable fixed-pattern mask (such as an LCD or a physical obstruction) could be used, or any other structure that selectively adds an optical path length of about ⅛ wavelength or more of the light used by the probe beam 806.

The camera 850 then records images at two or more optical phase retardations, typically 90° apart. For example, if hot frames are taken with 0, 90, 180 and 270 degree retardations, the resulting pixel intensities $I_{h1}$, $I_{h2}$, $I_{h3}$, and $I_{h4}$ are given by:

$$I_{h1}=I_d+I_s-\sqrt{I_d I_s}(\sin\phi_0-\delta\cos\phi_0) \qquad \text{Eq. 45}$$

$$I_{h2}=I_d+I_s-\sqrt{I_d I_s}(\sin(\phi_0+90°)-\delta\cos(\phi_0+90°)) \qquad \text{Eq. 46}$$

$$I_{h3}=I_d+I_s-\sqrt{I_d I_s}(\sin(\phi_0+180°)-\delta\cos(\phi_0+180°)) \qquad \text{Eq. 47}$$

$$I_{h4}=I_d+I_s-\sqrt{I_d I_s}(\sin(\phi_0+270°)-\delta\cos(\phi_0+270°)) \qquad \text{Eq. 48}$$

Which in turn can be simplified to:

$$I_{h1}=I_d+I_s-\sqrt{I_d I_s}(\sin\phi_0-\delta\cos\phi_0)0° \qquad \text{Eq. 50}$$

$$I_{h2}=I_d+I_s-\sqrt{I_d I_s}(\cos\phi_0+\delta\sin\phi_0)90° \qquad \text{Eq. 51}$$

$$I_{h3}=I_d+I_s+\sqrt{I_d I_s}(\sin\phi_0-\delta\cos\phi_0)180° \qquad \text{Eq. 52}$$

$$I_{h4}=I_d+I_s+\sqrt{I_d I_s}(\cos\phi_0-\delta\sin\phi_0)270° \qquad \text{Eq. 53}$$

Similarly, the pixel intensities of the cold frames (IR off) in 90° phase offsets can be written as:

$$I_{c1}=I_d+I_s-\sqrt{I_d I_s}\sin\phi_0 \qquad \text{Eq. 54}$$

$$I_{c2}=I_d+I_s-\sqrt{I_d I_s}\cos\phi_0 \qquad \text{Eq. 55}$$

$$I_{c3}=I_d+I_s+\sqrt{I_d I_s}\sin\phi_0 \qquad \text{Eq. 56}$$

$$I_{c4}=I_d+I_s+\sqrt{I_d I_s}\cos\phi_0 \qquad \text{Eq. 57}$$

Subtracting Eq. 54 from Eq. 50 gives $$I_{h1}-I_{c1}=\sqrt{I_d I_s}\delta\cos\phi_0 \qquad \text{Eq. 58}$$

Which can be solved to give:

$$\delta_1 = \frac{I_{h1}-I_{c1}}{\sqrt{I_d I_s}\cos\phi_0} \qquad \text{Eq. 59}$$

Where the subscript in the $\delta_1$ term indicates that it was calculated with the first phase retardation of 0°. Subtracting Eq. 55 from Eq. 51 gives $$I_{h2}-I_{c2}=\sqrt{I_d I_s}\delta_2\sin\phi_0 \qquad \text{Eq. 60}$$

Which can be solved to give:

$$\delta_2 = -\frac{I_{h2}-I_{c2}}{\sqrt{I_d I_s}\sin\phi_0} \qquad \text{Eq. 61}$$

Where the subscript in the $\delta_2$ term indicates that it was calculated with the second phase retardation of 90°. Equations 59 and 61 have differing dependencies on the DC phase $\phi_0$, and each equation used independently would have singularities. It is possible to eliminate the phase term $\phi_0$ and hence eliminate the singularity. If measurements at the 0 and 90° phase offsets are done with a sufficiently short separation in time and under the same conditions, the two photothermal difference amplitudes are the same, i.e. $\delta_1=\delta_2=\delta$. (This condition can be met if the measurements at 0/90° phase are performed within a time that is short compared to any significant drift in the measurement system.) Rearranging Eqs. 59 and 61 results in:

$$\cos\phi_0 = \frac{I_{h1}-I_{c1}}{\delta\sqrt{I_d I_s}} \qquad \text{Eq. 62}$$

$$\sin\phi_0 = \frac{I_{c2}-I_{h2}}{\delta\sqrt{I_d I_s}} \qquad \text{Eq. 63}$$

Using the identity, $\cos^2\phi_0 + \sin^2\phi = 1$ with Eqs. 62 and 63 gives:

$$\frac{1}{I_d I_s}\left[\left(\frac{I_{h1}-I_{c1}}{\delta}\right)^2 + \left(\frac{I_{c2}-I_{h2}}{\delta}\right)^2\right] = 1 \qquad \text{Eq. 64}$$

Which in turn can be solved to give:

$$\delta = \frac{1}{\sqrt{I_d I_s}}\sqrt{[(I_{h1}-I_{c1})^2 + (I_{c2}-I_{h2})^2]} \qquad \text{Eq. 65}$$

The factor $$\frac{1}{\sqrt{I_d I_s}}$$

is just a DC scaling factor and in some situations it is not necessary to measure this. For example, if the measurement system intensities are relatively stable and one wants to measure relative IR absorption spectra vs position, it can be sufficient to simply measure the quantity hot minus cold frames at two phases 90° apart (e.g. $(I_{h1}-I_{c1})$ and $(I_{h2}-I_{c2})$). Note that the Eq. 65 has the form of a root mean square (RMS) sum and is in fact the RMS sum of the in phase (0°) and quadrature (90°) photothermal difference images. This can then be repeated at a plurality of wavelengths of the IR source. Eq. 65 is a significant result as it allows rapid calculation of a signal that is indicative of the IR absorption spectrum of the sample, without the need to measure the optical phase $\phi_0$ or the $I_d$ and $I_s$ terms. In the case it is desired to perform a more quantitative measurement of $\delta$, it is possible to solve for the $$\frac{1}{\sqrt{I_d I_s}}$$

term using combinations of Eqs. 54-57. There are three unknowns $I_d$, $I_s$ and $\phi_0$, so using pixel values from at least three of Eqs 54-57 it is possible to solve for all the unknowns. One example is illustrated below in Eqs. 66-76.

Subtracting Eq. 54 from Eq. 56 and Eq. 55 from Eq. 57 gives:

$$I_{c3}-I_{c1} = 2\sqrt{I_d I_s}\sin\phi_0 \qquad \text{Eq. 66}$$

$$I_{c4}-I_{c2} = 2\sqrt{I_d I_s}\cos\phi_0 \qquad \text{Eq. 67}$$

Dividing Eq. 66 by Eq. 67 gives:

$$\tan\phi_0 = \frac{I_{c1}-(I_d+I_s)}{I_{c2}-(I_d+I_s)} \qquad \text{Eq. 68}$$

Which can be inverted to give:

$$\phi_0 = \tan^{-1}\left(\frac{I_{c1}-(I_d+I_s)}{I_{c2}-(I_d+I_s)}\right) \qquad \text{Eq. 69}$$

Adding Eq. 54 and Eq 56 gives:

$$I_{c1}+I_{c3} = 2(I_d+I_s) \qquad \text{Eq. 70:}$$

And:

$$(I_d + I_s) = \frac{I_{c1}+I_{c3}}{2} \qquad \text{Eq. 71}$$

Plugging Eq. 71 into Eq. 69 gives:

$$\phi_0 = \tan^{-1}\left(\frac{2I_{c1}-I_{c1}-I_{c3}}{2I_{c2}-I_{c1}-I_{c3}}\right) \qquad \text{Eq. 72}$$

Note this intermediate result also provides a quantitative measurement of the DC phase if desired. Eq. 66 can be re-arranged to give:

$$\frac{1}{\sqrt{I_d I_s}} = \frac{2\sin\phi_0}{I_{c3}-I_{c1}} \qquad \text{Eq. 73}$$

Plugging Eq. 72 into 73 gives:

$$\frac{1}{\sqrt{I_d I_s}} = \frac{2\sin\left(\tan^{-1}\left(\frac{2I_{c1}-I_{c1}-I_{c3}}{2I_{c2}-I_{c1}-I_{c3}}\right)\right)}{I_{c3}-I_{c1}} \qquad \text{Eq. 74}$$

Using the identity $$\sin(\tan^{-1}u) = \frac{u}{\sqrt{1+u^2}},$$

Eq. 71 can be rewritten as:

$$\frac{1}{\sqrt{I_d I_s}} = \frac{2}{I_{c3}-I_{c1}}\frac{u}{\sqrt{1+u^2}} \qquad \text{Eq. 75}$$

Where $$u = \frac{2I_{c1}-I_{c1}-I_{c3}}{2I_{c2}-I_{c1}-I_{c3}}$$

Plugging this into Eq. 65 gives $$\delta = \frac{2}{I_{c3}-I_{c1}}\frac{u}{\sqrt{1+u^2}}\sqrt{[(I_{h1}-I_{c1})^2 + (I_{c2}-I_{h2})^2]} \qquad \text{Eq. 76}$$

Note that it is also possible to extract the photothermal difference $\delta$ by inverting Eq. 37 to give:

$$\delta = \phi_s - \phi_0 \qquad \text{Eq. 78:}$$

This requires measuring the optical phase $\phi_s$ when the sample is illuminated by IR light and the phase $\phi_0$ when the IR light is off (i.e., hot and cold image frames). To extract the phase values, it is necessary to measure the hot and cold images for two or more phase offsets of the interferometer (e.g., 0° and 90°) and the phase values for example can be extracted using the inverse tangent or atan 2 function. An advantage, of the scheme outlined in Eqs. 62-65, however, is that it requires no computation of the DC phase values $\phi_0$ or $\phi_s$. The simple RMS sum calculation of Eq. 65 can in general be computed much faster than inverse tangents which can enable faster measurement times.

Figure 9:
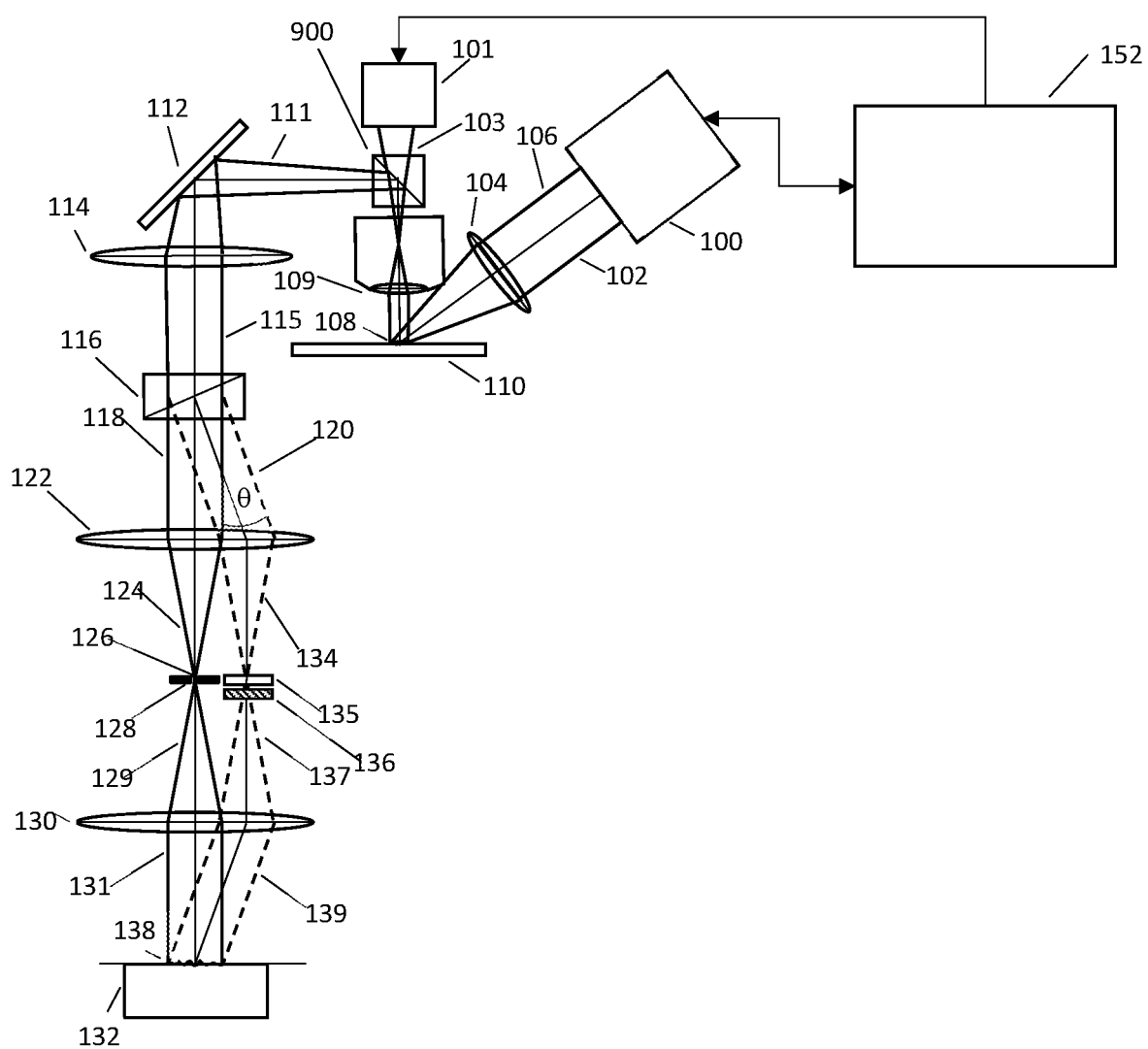
FIG. 9 is a schematic diagram of another system for a high-performance wide field photothermal IR spectroscopy and imaging using a non-diffractive beam splitter in a reflection mode configuration, according to an embodiment.

FIG. 9 illustrates an alternative embodiment using an epi-illumination scheme such that the sample in imaged in a reflection mode configuration. This arrangement is desirable for samples that are opaque to at least one of the IR and probe beams. FIG. 9 is based on FIG. 1 and where identical numerical callouts are used, the discussion associated with FIG. 1 applies as appropriate. Note that the epi-illumination scheme described associated with FIG. 9 can also be applied to the embodiments of FIGS. 5-8 as well. As with the other figures, infrared source 100 produces a beam of infrared radiation 102 that illuminates a region 108 of sample 110, exciting molecular resonances in IR absorbing regions of the sample and causing local heating that will be mapped by the probe beam. Probe beam source 101 emits a beam 103 of probe radiation that in this case is incident on a beam splitter 900. At least a portion of the probe beam 103 is then incident on a focusing optic 109. In this case focusing optic 109 is usually a microscope objective which in this epi-configuration will be used for both illumination and collection. In one embodiment, probe radiation 103 is focused onto the back focal plane of focusing optic 109 to create a wide area of illumination on sample 110 at least partially overlapping the IR illuminated region 108. Light reflected and scattered from the sample is recollected by focusing optic 109 (or alternately by another collection optic, not shown). If collected by focusing optic 109, the collected light returns to beam splitter 900 where at least a portion 111 of the reflected and scattered light is directed towards optional mirror 112 where it passes into the common path interferometer setup as described associated with FIGS. 1 and 2. To improve optical throughput beam splitter 900 may be a polarizing beam splitter used in combination with a quarter waveplate (not shown) to separate the incoming and outgoing beams with high efficiency. As before, pixel intensities collected at the surface 138 of camera 132 due to interference of sample and reference beams are used to create a signal that is indicative of IR absorption by the sample over a wide area. This epi-illumination/reflection mode scheme can also be applied to the Mach-Zender approaches of FIGS. 5 and 6, the beam splitter/D-mirror approach of FIG. 7, and the phase contrast approach of FIG. 8. In the case of FIG. 7, beam splitter 900 would be inserted between the phase annulus 808 and the focusing optic 812.

Figure 10:
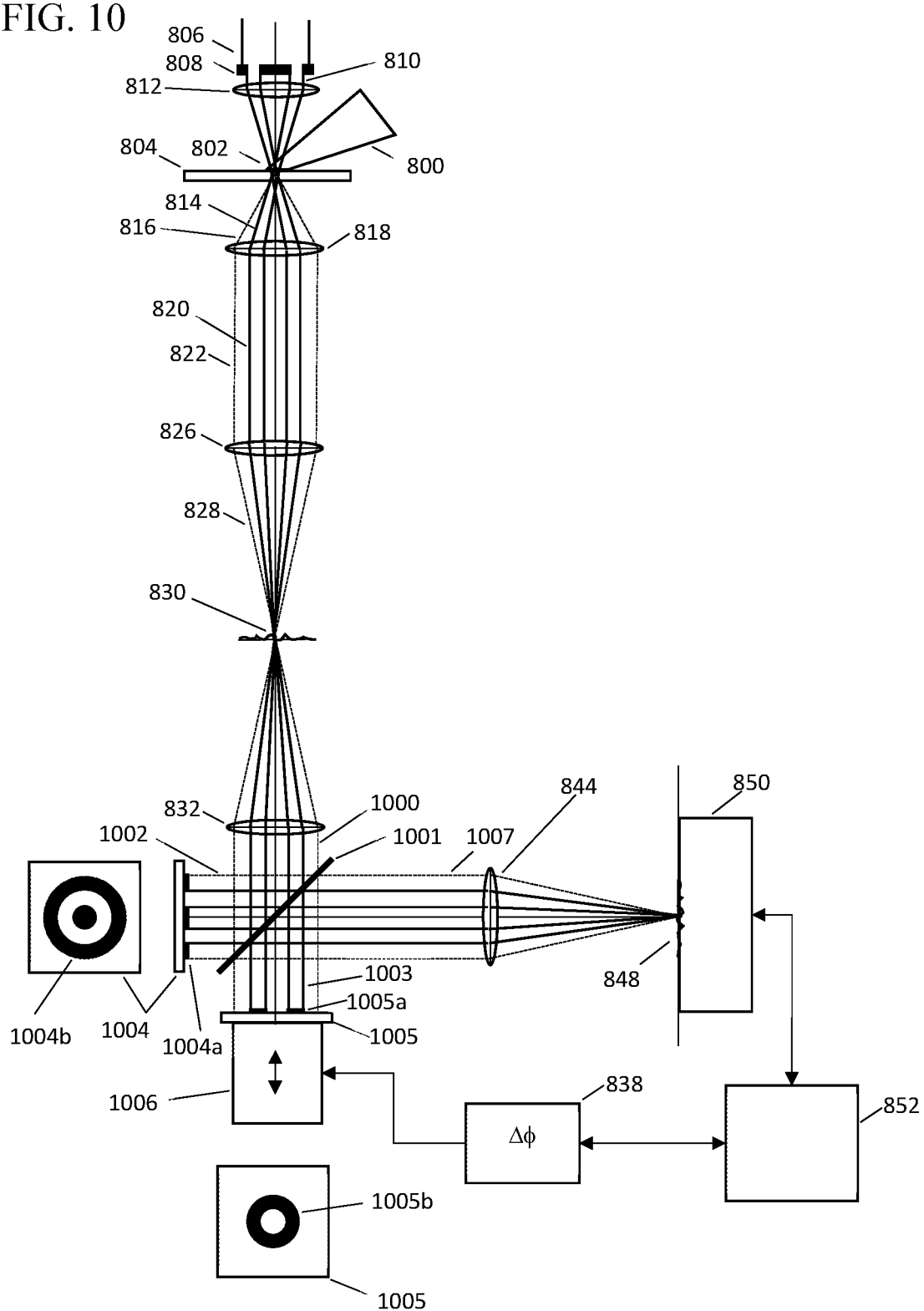
FIG. 10 is a schematic diagram of another system for a high-performance wide field photothermal IR spectroscopy and imaging using phase contrast microscopy with a variable phase interferometer, according to an embodiment.

FIG. 10 illustrates an alternative embodiment using a phase contrast detection scheme. FIG. 10 is based on FIG. 8 and where identical numerical callouts are used, the discussion associated with FIG. 8 applies as appropriate. As with FIG. 8, the embodiment of FIG. 10 starts with a ring of light 810 from an annulus 808, for example from a phase contrast condenser. As with FIG. 8, light that strikes the sample 804 can take one of two paths, path 814 for the "direct" or "surround" light and path 816 for scattered light. Light on both paths is collected by objective 818. In a traditional phase contrast microscope, a phase ring is placed at the back focal plane of objective 818. In this embodiment, a 4f optical relay system (e.g. with focusing optics 826 and 832) is used to relay an image of the back focal plane of the objective 818 to a new location where a variable phase interferometer is placed. Specifically, light beams 1000 that exit the 4f relay system strike beam splitter 1001 and split onto two different paths 1002 and 1003. A plate beam splitter is shown for beam splitter 1001, but a cube beam splitter e.g. a polarizing beam splitter cube may be used instead. The light on paths towards optical masks 1004 and 1005. Optical masks 1004 and 1005 have complementary reflective patterns, shown in cross-section at their approximate location in 1004a and 1005a and separately in face on views in 1004b and 1005b. The apparent thickness of the reflective patterns shown in cross-section is highly exaggerated for clarity in FIG. 10. The reflective coating need only be thick enough to reflect a substantial portion of the incident light beams 1002 and 1003. The reflective pattern 1005a on mask 1005 has a form similar to that traditionally used at the back focal plane of a phase contrast objective (i.e. a mask that interacts primarily with the "direct" or unscattered light). Mask 1004 with pattern 1004b is a substantially complementary mask that interacts primarily with the scattered light. As drawn the black circular regions of mask patterns 1004a and 1005a represent areas that are highly reflective and the white regions are either highly transmissive or absorptive.

A key difference here is that in a traditional phase contrast microscope, the phase mask at the back focal plane of the objective introduces a fixed optical phase shift (typically around 90°). The arrangement of FIG. 10, however, enables the creation and rapid adjustment of an arbitrary optical phase shift between the direct and scattered light. This is accomplished when the light on paths 1002 and 1003 are reflected back through beam splitter 1001 and are recombined onto optical path 1007 and then focused with focusing optic 844 onto the surface of camera 850. An interferogram 848 thus appears on the surface of camera 850 where the interferogram comprises the optical interference pattern of the light reflected back on path 1002 and the light reflected bath on path 1003, with any optical phase offset between the two paths introduced by a difference in optical path length on paths 1002 and 1003. A phase adjuster is used vary the phase of the optical interference pattern at the camera surface. For example, an actuator 1006 may be used to adjust the relative position of optical mask 1005 and/or optical mask 1004. The actuator can for example be a piezoelectric actuator, a voice coil actuator or any other actuator capable of providing precise relative motion of mask 1005 vs. mask 1004. Optional phase controller 838 can be used to generate control signals to adjust actuator 1006 to desired path length differences and hence desired optical phase shifts. Phase controller 838 may generate one or more voltages, currents, or other control signals to generate the desired phase shift. Controller 852 may be used to synchronize phase adjustment steps with acquisition of image frames from camera 850. Phase controller 838 and controller 852 may also be integrated into a single control unit in some embodiments. Image frames at camera 850 can then be acquired at a plurality of optical phases under the conditions of IR light on and off, following the description associated with FIG. 8. Notably, the optical phase can be adjusted extremely quickly in this case. For example, piezoelectric transducers are available with actuation frequencies in the kHz to hundreds of kHz or even MHz range, especially when only a small actuation range is required. To achieve a 90° phase shift, it is only necessary to move one of the reflective masks 1004 or 1005 by $\lambda/8$, where $\lambda$ is the wavelength of light used in the phase contrast detection. For example, at 532 nm wavelength, only 66.5 nm of motion is required for 90° phase shift. This is easily achievable, for example with Thorlabs model PA2AB piezo actuator, which has a range of 700 nm and a resonant frequency of 1.35 MHz. Many other suitable piezo actuators are available. Note that it may be desirable to include a variety of additional optical elements not shown to optimize the performance of the interferometer. For example, in the case that a polarizing beamsplitter is used, half wave plates and quarter wave plates can be used to optimize the transmission of light from the different interferometer arms to the camera. It can also be desirable to place an attenuator in the path of the direct light 1003 to better match the light received by the camera on the direct and scattered light paths. (The scattered light is typically substantially less than the direct light.) In the case of a plate beam splitter, it may be desirable to include a compensation plate in one of the interferometer arms to compensate for the fact that the light goes through the thickness of the beam splitter more times on one arm of the interferometer than the other. It is possible implement a single optical element that acts as both compensator and attenuator.

Figure 11:
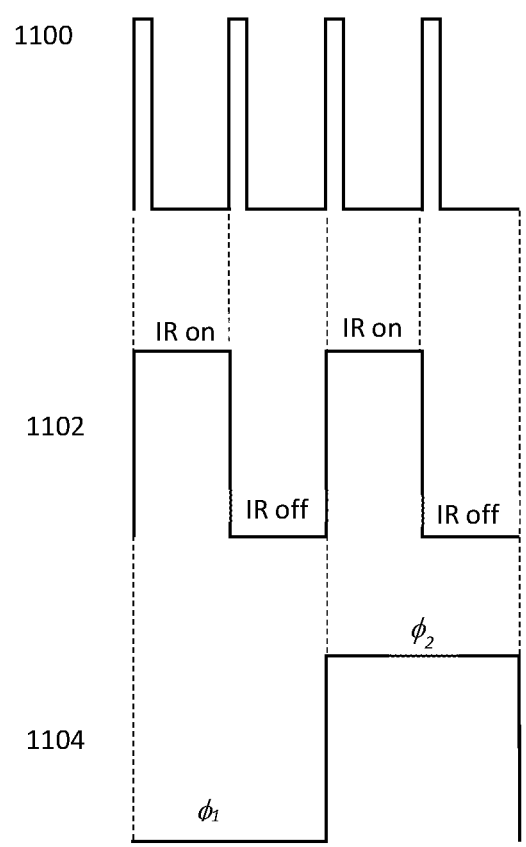
FIG. 11 is a schematic diagram of a timing diagram related to the embodiment of FIG. 10.

The high actuation speed of the embodiment of FIG. 10 has a specific advantage that it can enable adjustment extremely rapid adjustment of the optical phase of the interferometer of this phase contrast detection such that the measurements at two or more optical phases can occur nearly simultaneously, or more specifically separated by short enough times that there is minimal drift or vibration between the two arms of the interferometer. FIG. 11 shows an example timing diagram that can achieve photothermal measurements at two optical phases in rapid succession. Trace 1100 represents trigger pulses to initiate the acquisition of a camera frame. Trace 1102 shows a gating pulse to turn on and off IR light to illuminate the sample. (In practice the IR on gate may include many sub-pulses as infrared lasers can typically pulse at rates much faster than typical camera frame rates. For example, a high-speed camera may operate at 2000 frames per second, whereas a quantum cascade laser may by pulsed at 100 kHz or even MHz frequencies. As such, the IR source may provide many pulses per camera hot frame.) Trace 1104 represents the control signal alternating the optical phase of the interferometer of FIG. 10 between two successive relative phases $\phi_1$, and $\phi_2$, such as 0° and 90°, though in alternative embodiments different relative phases could be used. The time difference between the two measurements at two optical phases can be very short. For example, consider acquiring images at camera 850 at a rate of 2000 frames per second where the IR light is gated on and off every other frame as shown in trace 1102. In this case, the optical phase would be adjusted after each hot/cold image pair, such as at 1000 Hz. Thus, the measurements between successive optical phase steps would be 1 msec, during which time the interferometer drift/vibration will be minimal. The use of a piezoelectric actuator or other high-speed actuator makes it possible to achieve the desired phase adjustments on such short time scales, for example in less than 100 msec, less than 10 msec, or even less than 1 msec. This approach is advantageous because it can provide phase adjustments on time scales even faster than a typical pixelated spatial light modulator and also at substantially reduced cost. It is also possible to invert the phase offsets and the IR on/off gating, for example alternating the phase ever other camera image and then gating the IR on/off after each dual phase measurement. This latter scheme would then achieve 500 μsec between the two different phases and provide even more immunity to interferometer drift/vibration. (Which approach is preferable depends on the relative stability of the probe light source/microscope versus the interferometer.)

Optical Efficiency

The following section addresses optical efficiency which is a critical factor to enable high SNR measurements at high frame rates. The embodiments described herein in FIGS. 1, 2, 5-9 employ optically efficient designs that arrange for optical throughputs ranging from 42% to 88%. A key to this efficiency is the use of non-diffractive beam splitters to separate the sample and reference beams. For example, the embodiments of FIGS. 1-2 employ polarizing beam splitter prisms (e.g. Rochon or Wollaston gratings). The embodiments of FIGS. 1-2 can achieve an optical throughput of around 44% on each of the sample and reference arm (88% total), accounting for reflection losses at optical component surface and throughput through the spatial filter. (Note this estimate does not account for the efficiency of collection or transmission of the scattered light because this is highly sample dependent.) The optical throughput of the configuration of FIG. 5 can achieve a total optical throughput around 42%. The primary reason for the lower optical throughput is the use of beam splitter 516 which discards roughly half of the light that is reflected/transmitted in the downwards direction and thus not striking camera 132. A second camera, however, can be placed below beam splitter 516 thus capturing light on the alternate path, bringing the total optical efficiency to 84%.

Optical throughputs for the various configurations described herein are summarized in the table below. This is significantly better than can be achieved by the diffractive beam separation approach described in Miu Tamamitsu, Keiichiro Toda, Ryoichi Horisaki, and Takuro Ideguchi, "Quantitative phase imaging with molecular vibrational sensitivity," Opt. Lett. 44, 3729-3732 (2019), https://doi.org/10.1364/OL.44.003729. The use of a Ronchi ruling to diffract the light for the sample and reference beam does not lead to high optical throughput, as can be seen in an analysis of transmission efficiency of Ronchi gratings as described in James E. Harvey, Richard N. Pfisterer, "Understanding diffraction grating behavior: including conical diffraction and Rayleigh anomalies from transmission gratings," Opt. Eng. 58(8) 087105 (28 Aug. 2019) https://doi.org/10.1117/1.OE.58.8.087105. See for example FIG. 15 and Table 2 of the Harvey reference. The use of diffractive beam separation has a total optical efficiency of <35% because only around 25% of the light is transmitted in the $0^{th}$ diffraction order of the reference path and around 10% into the +1 order. (50% of the light is entirely blocked by the grating, another 10% of the light is discarded in the −1 order. In practice other optical losses would provide a best case optical throughput of around 33%. This approach is especially disadvantageous from an optical efficiency standpoint considering that only 10% of the incident light that interacts with the sample makes it to the detector, whereas the embodiments described herein with non-diffractive beam splitters have as much as >80% of the light interacting with the sample incident on the detector.

| Embodiment | Total optical throughput |
| --- | --- |
| FIGS. 1-2 | 88% |
| FIG. 5 | 42% (single camera) 84% (dual camera) |
| FIG. 6 | 81% |
| FIG. 7 | 88% |
| FIG. 8 | 82% |
| FIG. 9 | 80% |
| Diffractive beam separation | 33% |

The embodiments described herein are exemplary. Modifications, rearrangements, substitute processes, alternative elements, etc. may be made to these embodiments and still be encompassed within the teachings set forth herein. One or more of the steps, processes, or methods described herein may be carried out by one or more processing and/or digital devices, suitably programmed.

Depending on the embodiment, certain acts, events, or functions of any of the method steps described herein can be performed in a different sequence, can be added, merged, or left out altogether (e.g., not all described acts or events are necessary for the practice of the algorithm). Moreover, in certain embodiments, acts or events can be performed concurrently, rather than sequentially.

The various illustrative logical blocks, optical and control elements, and method steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processor configured with specific instructions, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. A software module can comprise computer-executable instructions which cause a hardware processor to execute the computer-executable instructions.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of Section 112, sixth paragraph of 35 U.S.C. are not to be invoked unless the specific terms "means for" or "step for" are recited in a claim.

While the above detailed description has shown, described, and pointed out novel features as applied to illustrative embodiments, it will be understood that various omissions, substitutions, and changes in the form and details of the devices or methods illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

The invention claimed is:

1. A system for infrared analysis over a wide field area of a sample, the system comprising:
   an infrared source configured to illuminate a region of the sample with a pump beam of infrared radiation to create in infrared illuminated region;
   a probe radiation source configured to generate a probe beam that illuminates a wide field region of the sample wherein the wide field region is at least 50 microns in diameter and at least partially overlaps the infrared illuminated region of the sample;
   a collection optic arranged to collect at least a portion of the probe beam that has interacted with the sample;
   a first optical system comprising a non-diffractive beam splitter that divides the probe beam collected from the sample onto at least two paths, a first path for a reference beam and a second path for a sample beam;
a second optical system comprising a 4f optical relay system and arranged to spatially filter the reference beam and create an inteferogram formed between the reference beam and the sample beam as part of an image of the region of the sample on a surface of an array detector that is captured as an image frame of the wide field region of the sample; and
an analyzer configured to analyze the image frame to determine signals indicative of photothermal infrared absorption over the wide field area of the sample.

2. The system of claim 1 wherein the array detector is a camera having a frame rate for capturing successive image frames of the wide field area of the sample of at least 100 frames per second.

3. The system of claim 1 wherein the first optic system comprises:
an illumination portion that includes light from a collected probe beam that was transmitted through the sample in a substantially undeflected state; and
an imaging portion that includes light from the collected probe beam that is at least one of scattered, refracted, and reflected at the sample;
wherein the illumination portion and the imaging portion each include image data corresponding to characteristics of the sample, and
wherein the non-diffractive beam splitter divides the probe beam such that the illumination portion comprises the reference beam and the imaging portion comprises the sample beam.

4. The system of claim 1 wherein the second optic system comprises a system of lenses configured to:
focus a first portion of the illumination portion having a first polarization at a spatial filter such that the image data corresponding to the characteristics of the sample in a first portion of the illumination portion is removed;
focus a second portion of the illumination portion having a second polarization different from the first polarization at a polarization rotator such that a second portion of the illumination portion retains the image data corresponding to characteristics of the sample;
direct a first portion of the imaging portion having the first polarization at the spatial filter such that a majority of the first portion of the imaging portion is blocked;
direct a second portion of the imaging portion having the second polarization at the polarization rotator such that the second portion of the illumination portion retains the image data corresponding to the characteristics of the sample; and
interfere the first portion of the illumination portion, the second portion of the illumination portion, the first portion of the imaging portion that is not blocked, and the second portion of the imaging portion to form a recombined beam as the image of the region of the sample on the surface of the array detector that is captured as the image frame of the wide field area of the sample,
wherein the polarization rotator is configured to impart the first polarization on the second portion of the illumination portion and the second portion of the imaging portion at the recombined beam.

5. A system for infrared analysis over a wide field area of a sample, the system comprising:
an infrared source configured to illuminate a region of the sample with a pump beam of infrared radiation to create in infrared illuminated region;
a probe radiation source configured to generate a probe beam that illuminates a wide field region of the sample wherein the wide field region is at least 50 microns in diameter and at least partially overlaps the infrared illuminated region of the sample;
a collection optic arranged to collect at least a portion of the probe beam that has interacted with the sample;
a first optical system comprising a non-diffractive beam splitter that divides the probe beam collected from the sample onto at least two paths, a first path for a reference beam and a second path for a sample beam;
a second optical system comprising a 4f optical relay system and arranged to spatially filter the reference beam and create an interferogram formed between the reference beam and the sample beam as part of an image of the region of the sample on a surface of an array detector that is captured as an image frame of the wide field region of the sample; and
an analyzer configured to analyze the image frame to determine signals indicative of photothermal infrared absorption over the wide field area of the sample, wherein the array detector is a camera and the first optic system and the second optic system are configured to provide an optical throughput efficiency of at least 50%.

6. The system of claim 5 wherein the non-diffractive beam splitter comprises at least one of a Wollaston prism, a Rochon prism, a reflective beam splitter or a polarizing beam splitter.

7. The system of claim 5 wherein the first optic system comprises:
an illumination portion that includes light from the probe beam that was transmitted through the sample in a substantially undeflected state; and
an imaging portion that includes light from the probe beam that is at least one of scattered, refracted, and reflected at the sample;
wherein the illumination portion and the imaging portion each include image data corresponding to characteristics of the sample, and
wherein the non-diffractive beam splitter divides the probe beam such that the illumination portion comprises the reference beam and the imaging portion comprises the sample beam.

8. The system of claim 5 wherein the second optic system comprises a system of lenses configured to:
focus a first portion of the illumination portion having a first polarization at a spatial filter such that the image data corresponding to the characteristics of the sample in a first portion of the illumination portion is removed;
focus a second portion of the illumination portion having a second polarization different from the first polarization at a polarization rotator such that a second portion of the illumination portion retains the image data corresponding to characteristics of the sample;
direct a first portion of the imaging portion having the first polarization at the spatial filter such that a majority of the first portion of the imaging portion is blocked;
direct a second portion of the imaging portion having the second polarization at the polarization rotator such that the second portion of the illumination portion retains the image data corresponding to the characteristics of the sample; and
interfere the first portion of the illumination portion, the second portion of the illumination portion, the first portion of the imaging portion that is not blocked, and the second portion of the imaging portion to form a recombined beam as the image of the region of the sample on the surface of the array detector that is captured as the image frame of the wide field area of the sample, wherein the polarization rotator is configured to impart the first polarization on the second portion of the illumination portion and the second portion of the imaging portion at the recombined beam.

9. A system for infrared analysis over a wide field area of a sample, the system comprising:

an infrared source configured to illuminate a region of the sample with a pump beam of infrared radiation to create an infrared illuminated region;

a probe radiation source configured to generate an annular probe beam that illuminates a wide field region of the sample wherein the wide field region is at least 50 microns in diameter and at least partially overlaps the infrared illuminated region of the sample;

a collection optic arranged to collect the probe beam from the sample;

an optical system comprising a 4f optical relay system including at least one variable phase retarder configured with an annular phase shift pattern to create phase contrast interference between direct/surround illumination probe from the light beam that passes through the sample with light from the probe beam scattered by the sample to create an interference image on a surface of an array detector that is captured as an image frame of the wide field region of the sample; and an analyzer configured to analyze the image frame to determine signals indicative of photothermal infrared absorption over the wide field area of the sample.

10. The system of claim 9 further comprising a camera having a frame rate for capturing successive image frames of the wide field area of the sample of at least 100 frames per second, wherein the camera is configured to receive the image frame of the wide field region of the sample.

11. The system of claim 9 wherein the annular probe beam is pulsed at a rate at least equal to the frame rate of the camera.

12. The system of claim 9 wherein the optical system further comprises a non-diffractive beam splitter configured to divides the probe beam such that an illumination portion comprises the reference beam and an imaging portion comprises the sample beam.

13. A system for infrared analysis over a wide field area of a sample, the system comprising:

an infrared source configured to illuminate a region of the sample with a pump beam of infrared radiation to create in infrared illuminated region;

a probe radiation source configured to generate a probe beam that illuminates a region of the sample that at least partially overlaps the infrared illuminated region of the sample;

a collection optic arranged to collect at least a portion of probe beam radiation after interacting with the sample;

a beam splitter that divides the collected probe beam onto at least two paths, including a first path and a second path;

a first optical mask on the first path having a first reflection pattern arranged to substantially reflect direct light comprising collected probe beam radiation that has not been substantially deflected by the sample;

a second optical mask on the second path having a second reflection pattern that is a counterpart to the first reflection pattern and is arranged to substantially reflect scattered light comprising collected probe radiation that has been scattered by the sample;

a camera configured to capture image frames corresponding to interferograms between the reference beam and the sample beam;

a phase adjuster arranged to adjust a relative optical phase between direct light and scattered light reflected from the first and second reflectors; and an analyzer configured to analyze the image frames at at least two relative optical phases to determine signals indicative of photothermal infrared absorption over the wide field area of the sample.

14. The system of claim 13, wherein the phase adjuster comprises an actuator that moves at least one of first or second mask.

15. The system of claim 14, wherein the actuator comprises at least one of a piezoelectric and voice coil actuator.

16. The system of claim 13, wherein the actuator is configured to adjust the relative optical phase such that each frame has a duration of less than 100 msec, more preferably less than 10 msec, and even more preferably less than 1 msec.

17. The system of claim 13, wherein the camera is configured to capture at least two image frames having a phase offset that is substantially 90 degrees.

18. The system of claim 13 wherein area of the sample illuminated by the probe beam the is at least 50 microns in diameter.

* * * * *